(12) United States Patent
Schramm et al.

(10) Patent No.: US 10,296,071 B2
(45) Date of Patent: *May 21, 2019

(54) SYSTEM AND METHOD FOR FULL RANGE CONTROL OF DUAL ACTIVE BRIDGE

(71) Applicant: General Electric Company, Schenectady, NY (US)

(72) Inventors: Simon Herbert Schramm, Garching B. Munchen (DE); Said Farouk Said El-Barbari, Garching B. Munchen (DE); Stefan Schroeder, Garching B. Munchen (DE); Zhihui Yuan, Garching B. Munchen (DE)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,131

(22) Filed: Sep. 7, 2018

(65) Prior Publication Data

US 2019/0073021 A1    Mar. 7, 2019

Related U.S. Application Data

(63) Continuation of application No. 14/547,178, filed on Nov. 19, 2014, now Pat. No. 10,073,512.

(51) Int. Cl.
*H02M 3/335* (2006.01)
*G06F 1/3287* (2019.01)
*G06F 1/3293* (2019.01)

(52) U.S. Cl.
CPC .......... *G06F 1/3287* (2013.01); *G06F 1/3293* (2013.01); *H02M 3/33584* (2013.01)

(58) Field of Classification Search
None
See application file for complete search history.

(56) References Cited

U.S. PATENT DOCUMENTS 5,027,264 A * 6/1991 DeDoncker ....... H02M 3/33584
363/129
5,208,740 A * 5/1993 Ehsani .............. H02M 3/33561
363/124

(Continued)

*Primary Examiner* — Emily P Pham
*Assistant Examiner* — David A. Singh
(74) *Attorney, Agent, or Firm* — Christopher R. Carroll; The Small Patent Law Group LLC

(57) ABSTRACT

A power converter includes primary and secondary bridges, a transformer, and a controller configured to generate a switching mode map that correlates each of a plurality of switching modes to a respective set of value ranges of system parameters of the power converter. The sets of system parameter value ranges are contiguous and non-overlapping across the switching mode map, each of the plurality of switching modes includes gate trigger voltage timings for commuting at least one of the primary and secondary bridges. The controller is configured to obtain a plurality of measured system parameter values, select from the switching mode map one of the plurality of switching modes that correlates to the set of system parameter values containing the plurality of measured system parameter values, and adjust gate trigger voltage timings of at least one of the primary and secondary bridges, according to the selected switching mode.

4 Claims, 27 Drawing Sheets

(56) References Cited

U.S. PATENT DOCUMENTS

| | | | | |
|---|---|---|---|---|
| 6,335,871 | B1* | 1/2002 | Kita | H02M 3/33584 363/35 |
| 10,073,512 | B2* | 9/2018 | Schramm | G06F 1/3287 |
| 2008/0284252 | A1* | 11/2008 | Jones | H02J 3/01 307/82 |
| 2009/0034299 | A1* | 2/2009 | Lev | H02M 3/33592 363/17 |
| 2009/0129123 | A1* | 5/2009 | Taurand | H02M 3/33576 363/17 |
| 2013/0044519 | A1* | 2/2013 | Teraura | H02M 3/33584 363/17 |
| 2014/0078782 | A1* | 3/2014 | Rosado | H02M 3/33584 363/17 |
| 2014/0185328 | A1* | 7/2014 | Rosado | H02M 1/40 363/17 |
| 2015/0349649 | A1* | 12/2015 | Zane | H02M 3/33507 363/21.03 |
| 2016/0020702 | A1* | 1/2016 | Trescases | H02M 3/33592 363/17 |
| 2016/0139651 | A1* | 5/2016 | Schramm | G06F 1/3287 713/323 |

* cited by examiner

321

CALCULATE GATE VOLTAGE TRIGGER TIMING

BOT MODE
X = fsw_e*Ls*(Vp-Vs*n);
PhF = -pi*X*sqrt(-I2_dc_ref*n/X)/(Vp*n);
Theta_1 = real(-2*pi*X/(Vp*n)*sqrt(-I2_dc_ref*n/X)/(2*pi));
Theta_2 = real(2*pi*Vs*X/(Vp*(Vp-Vs*n))*sqrt(-I2_dc_ref*n/X)/(2*pi));

BUT MODE
X = fsw_e*Ls*(Vp-Vs*n);
PhF = pi*X*sqrt(I2_dc_ref*Vp*Vs/X)/(Vp*Vs*n);
Theta_1 = real(2*pi*X/(Vp*(Vp-Vs*n))*sqrt(I2_dc_ref*Vp*Vs/X)/(2*pi));
Theta_2 = real(2*pi*X/(Vs*n*(Vp-Vs*n))*sqrt(I2_dc_ref*Vp*Vs/X)/(2*pi));

TRAPEZOIDAL MODE
K = 4*I2_dc_ref*fsw_e*Ls;
X = sqrt(Vp^3*Vs*n^3-K*Vp^3*n-K*Vp^2*Vs*n^2-K*Vp*Vs^2*n^3);
PhF = pi*(Vp^3*n-Vp*X-Vs*n*X+Vp*Vs^2*n^3)/(2*Vp*n*(Vp^2+Vp*Vs*n+Vs^2*n^2));
den = Vp^2+Vp*Vs*n+Vs^2*n^2;
Theta_1 = real(pi*(Vs^2*n^3-X)/(n*den)/(2*pi));
Theta_2 = real(pi*Vs*(Vp^2*n+Vp*Vs*n^2+X)/(Vp*den)/(2*pi));

BuST MODE
K = 2*I2_dc_ref*fsw_e*Ls*Vp*n;
Theta_11 = (pi/2-(pi*sqrt((Vp^2*n^2)/4-K-(Vs^2*n^4)/4))/(Vp*n)+pi*Vs*n/(2*Vp))/(2*pi);
Theta_21 = (pi*(sqrt(Vp^2*n^2-8*I2_dc_ref*fsw_e*Ls*Vp*n-Vs^2*n^4)+Vs*n^2+Vp*n)/(2*Vp*n))/(2*pi);
Theta_12 = (pi/2+(pi*sqrt((Vp^2*n^2)/4-K-(Vs^2*n^4)/4))/(Vp*n)+pi*Vs*n/(2*Vp))/(2*pi);
Theta_22 = (pi*(Vs^2*n^2-sqrt(Vp^2*n^2-8*I2_dc_ref*fsw_e*Ls*Vp*n-Vs^2*n^4)+Vp*n)/(2*Vp*n))/(2*pi);

FIG. 19

```
SPS_MODE
PhF1sps = real(-pi*(sqrt(Vp*Vs*n*(Vp*Vs*n-8*Pdes*fsw_e*Ls)/4)-Vp*Vs*n/2)/(Vp*Vs*n)/(2*pi));
PhF2sps = real(pi*(sqrt(Vp*Vs*n*(Vp*Vs*n-8*Pdes*fsw_e*Ls)/4)+Vp*Vs*n/2)/(Vp*Vs*n)/(2*pi)); %

% Phase shift to start with zero current:
% Pdif>0
th = (2*PhF*n*Vs+0.5*(Vp-n*Vs))/(2*(Vp+n*Vs));
% Pdif<0
th = PhF - (2*PhF*n*Vs+0.5*(Vp-n*Vs))/(2*(Vp+n*Vs));

% Periodic Timing
pTheta_1 = Theta_1;
pTheta_2 = Theta_2;
pTheta_3 = 0.5;
pTheta_4 = 0.5+ Theta_1;
pTheta_5 = 0.5+ Theta_2;
pTheta_6 = 1;

% Device Selection based on Timing (just illustrative)
/* Primary Side */
T1_on_1 = 0 + ptDead;
T1_off_1 = pTheta2;
T2_on_1 = pTheta2 + ptDead;
T2_off_1 = pTheta5;
T3_on_1 = pTheta3 + ptDead;
T3_off_1 = pTheta6;
T4_on_1 = 0 + ptDead;
T4_off_1 = pTheta3;
/* Secondary Side */
T5_on_1 = pTheta5 + ptDead;
T5_off_1 = pTheta1;
T6_on_1 = pTheta2 + ptDead;
T6_off_1 = pTheta4;
T7_on_1 = -1;
T7_off_1 = 0;
T8_on_1 = -1;
T8_off_1 = 0;
```

FIG. 20

SYSTEM AND METHOD FOR FULL RANGE CONTROL OF DUAL ACTIVE BRIDGE

CROSS-REFERENCE TO RELATED APPLICATIONS

This application is a continuation of and claims priority to U.S. patent application Ser. No. 14/547,178, which was filed 19 Nov. 2014, and the entire disclosure of which is incorporated herein by reference.

BACKGROUND

Technical Field

Embodiments of the invention relate generally to power converters. Particular embodiments relate to dual active bridge power converters.

Discussion of Art

Power supplies are electronic/electrical circuits that supply electric power to one or more electric loads. The term "power supply" is most commonly applied to collections or an assembly of electrical devices that convert one form of electrical energy to another and are commonly referred to as "power converters." Many power supplies include two or more power converters connected together. Typically, power converters are "switching" power converters, in which multiple solid state devices are used to rapidly and intermittently interrupt or commutate an input current so as to effectuate conversion of the input current to an output current having different amplitude, voltage, and/or frequency. For example, a "DC power converter" produces output power at a substantially constant output voltage and/or current.

Conventional power converters, generally, are groupings of plural solid state switches that are connected to output terminals from a first DC input terminal or from a second DC input terminal. The two DC terminals typically are known jointly as a "DC link," while the term "DC link voltage" often is used to refer to a potential difference across this DC link. Power conversion typically is a dynamic process that requires rapidly sequenced changes in state of the solid state switches. Although the switches exhibit high conduction or resistance in their closed or open steady states, in transition between states the solid state switches typically exhibit capacitive and resistive "switching losses."

Power converters can be designed on a dual active bridge (DAB) topology to provide an adjustable bi-directional power flow between two isolated DC links over a broad range of voltage ratio. Conventionally, power flow control is achieved by adjusting only the phase shift between the primary and the secondary side. This control is simple to implement and allows a large operating range. However, phase shift control can drive large currents inside the converter components when the output voltage ratio is substantially different from the transformer ratio. The result in higher conduction and switching losses of the semiconductors and the current may also exceed the maximum current capability of the devices. Hence, the DAB may not be operable at certain voltage ratios even at reduced power levels. Accordingly, conventional DABs typically are operated only in a relatively small voltage ratio range for which they have been designed. In the literatures, special operating modes are proposed that allow improved operation in some special operating points. Switching between modes transiently can have at least the following adverse effects: discontinuities of the switching pattern (leading to unpredictable and possibly excessive electrical transients within the switches), gaps in the operating range, different transfer gains resulting in control instabilities.

BRIEF DESCRIPTION

Embodiments of the invention provide a power converter, which includes primary and secondary bridges, a transformer, and a controller configured to generate a switching mode map that correlates each of a plurality of switching modes to a respective set of value ranges of system parameters of the power converter. The sets of system parameter value ranges are contiguous and non-overlapping across the switching mode map; each of the plurality of switching modes includes gate trigger voltage timings for commuting at least one of the primary and secondary bridges. The controller is configured to obtain a plurality of measured system parameter values, select from the switching mode map one of the plurality of switching modes that correlates to the set of system parameter values containing the plurality of measured system parameter values, and adjust gate trigger voltage timings of at least one of the primary and secondary bridges, according to the selected switching mode.

Other embodiments provide a controller that is configured to commute primary and secondary bridges of a dual active bridge power converter, according to any of a plurality of switching modes, in order to maintain secondary link voltage and power requirements. The controller is configured to generate a switching mode map of system parameter values that bound the plurality of switching modes, and is configured to select from the switching mode map, based on measured values of system parameters including at least primary link voltage and secondary link voltage, one of the plurality of switching modes that corresponds to a target value of secondary link current. The controller also is configured to adjust gate trigger voltage timing according to the selected switching mode, in order to maintain a target value of secondary link voltage.

Other aspects of the invention relate to a method for controlling a power converter having primary and secondary bridges. The method includes generating a switching mode map that correlates each of a plurality of switching modes to a respective set of system parameter value ranges, the sets of system parameter value ranges being contiguous and non-overlapping across the switching mode map; obtaining a plurality of measured system parameter values; selecting from the switching mode map one of the plurality of switching modes that correlates to the set of system parameter value ranges containing the plurality of measured system parameter values; and adjusting gate trigger voltage timing according to the selected switching mode, in order to maintain a target value of power transferred between the primary and secondary bridges.

DRAWINGS

The invention will be better understood from reading the following description of non-limiting embodiments, with reference to the attached drawings, wherein below:

FIG. 19 shows equations implemented by the controller shown in FIG. 1 to calculate gate trigger voltage timing according to various switching modes as shown in FIGS. 11-18.

FIG. 20 shows equations implemented by the controller shown in FIG. 1 to calculate gate trigger voltage timing according to various switching modes as shown in FIGS. 11-18.

DETAILED DESCRIPTION

Figure 1:
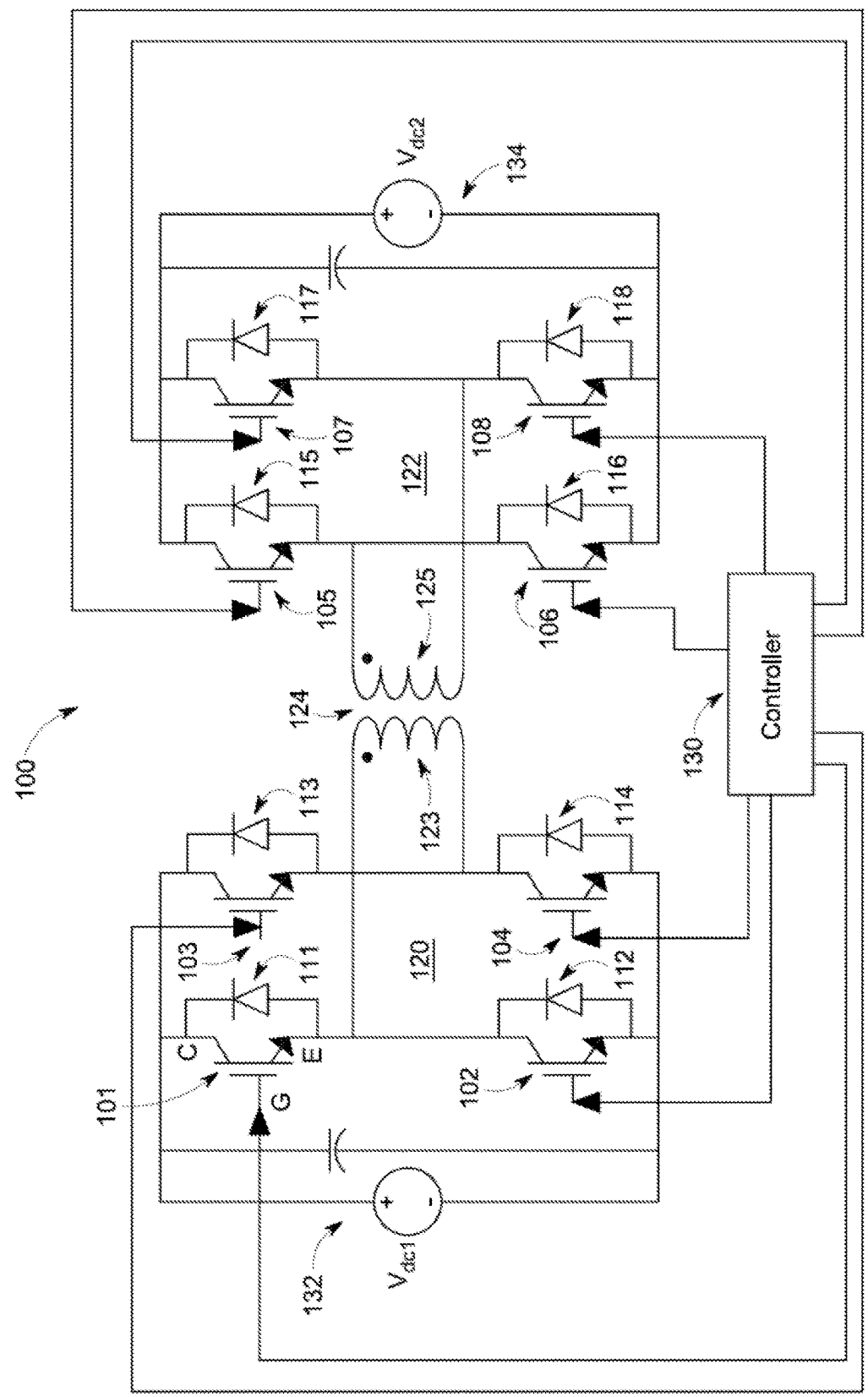
FIG. 1 shows an electrical schematic of a dual active bridge power converter with a controller configured according to a first embodiment of the invention.

Thus, according to aspects of the present invention, a generalized control scheme is provided that allows reduced loss operation across an enlarged voltage and power range including power flow reversal. The generalized control scheme subdivides a voltage ratio/power plane into subareas in which different modulation schemes are applied. In certain aspects, the modulation schemes include single-phase shift, trapezoidal triple phase shift, trapezoidal dual phase shift, and triangular. The different schemes allow continuous operation across the voltage/power plane.

Reference will be made below in detail to exemplary embodiments of the invention, examples of which are illustrated in the accompanying drawings. Wherever possible, the same reference characters used throughout the drawings refer to the same or like parts, without duplicative description.

Aspects of the invention relate to reducing switching losses in power converters. As discussed above, selecting a switching mode that uses optimal gate trigger voltage timing can reduce switching losses.

FIG. 1 illustrates an embodiment of the invention in which a single-phase isolated bi-directional H-bridge power converter 100 includes a plurality of semiconductor switches 101, 102, 103, 104, 105, 106, 107, 108. Each switch 101-108 has a collector C, a gate G, and an emitter E. Each switch also has a corresponding freewheeling diode 111, 112, 113, 114, 115, 116, 117, and 118, which is connected anti-parallel across the collector C and the emitter E.

Switches 101, 102, 103, 104 and their freewheeling diodes 111, 112, 113, 114 are arranged to form a primary bridge 120, and are "primary switches" (referring to switches of the primary bridge), while switches 105, 106, 107, 108 and their freewheeling diodes 115, 116, 117, 118 are arranged to form a secondary bridge 122 and are "secondary switches" (referring to switches of the secondary bridge). The primary bridge 120 is connected to commutate a DC supply voltage V1 or Vp to provide AC voltage across, and AC current through, a primary coil 123 of a transformer 124. The secondary bridge 122 is connected to provide a DC load voltage V2 or Vs by commutating the AC voltage that is induced in a secondary coil 125 of the transformer 124. For smoothing, capacitors can be attached across the outside legs of the primary and secondary bridges.

Notably, switch 105 is "homologous" to switch 101, in that switch 101 is connected to the high terminal of the transformer primary coil 123 while switch 105 is connected to the high terminal of the transformer secondary coil 125, so that each of the switches in its own bridge functions similarly to the other switch in its other, respective bridge. Similarly, switches 102-106, 103-107, and 104-108 also are "homologous."

Still referring to FIG. 1, a controller 130 is connected to intermittently supply and remove trigger voltages Vg1, Vg2, Vg3, Vg4, Vg5, Vg6, Vg7, Vg8 between each of the gates G and each of the emitters E associated with the switches 101-108, thereby switching ON or OFF each switch 101-108 in turn. The switches 101-108 are connected with the transformer 124 to form a Dual-Active-Bridge ("DAB") Topology, so that the switches can be commutated to provide an adjustable bi-directional power flow over a broad voltage ratio range between the electrically isolated DC-links 132, 134. Conventionally, power flow is adjusted by varying a phase shift between the trigger voltages of the homologous primary and secondary switches (e.g. triggering switch 105 at varying delays before, or after, switch 101). The algorithm for varying phase shift is known as a "switching mode." For example, a "single phase shift" ("SPS") switching mode is simple to implement and has generally been considered as affording a large operating range.

The operating range afforded by SPS has an upper bound or Pmax, which is the maximum power transferable through the transformer 124 with no "Zero voltage time" (no time when the transformer windings 121, 125 are not connected across the primary and secondary links 132, 134). For SPS, the following equation applies:

$$P_{max\_SPS} = n*Vs*Vp/(8*fsw*Ls).$$

Figure 2:
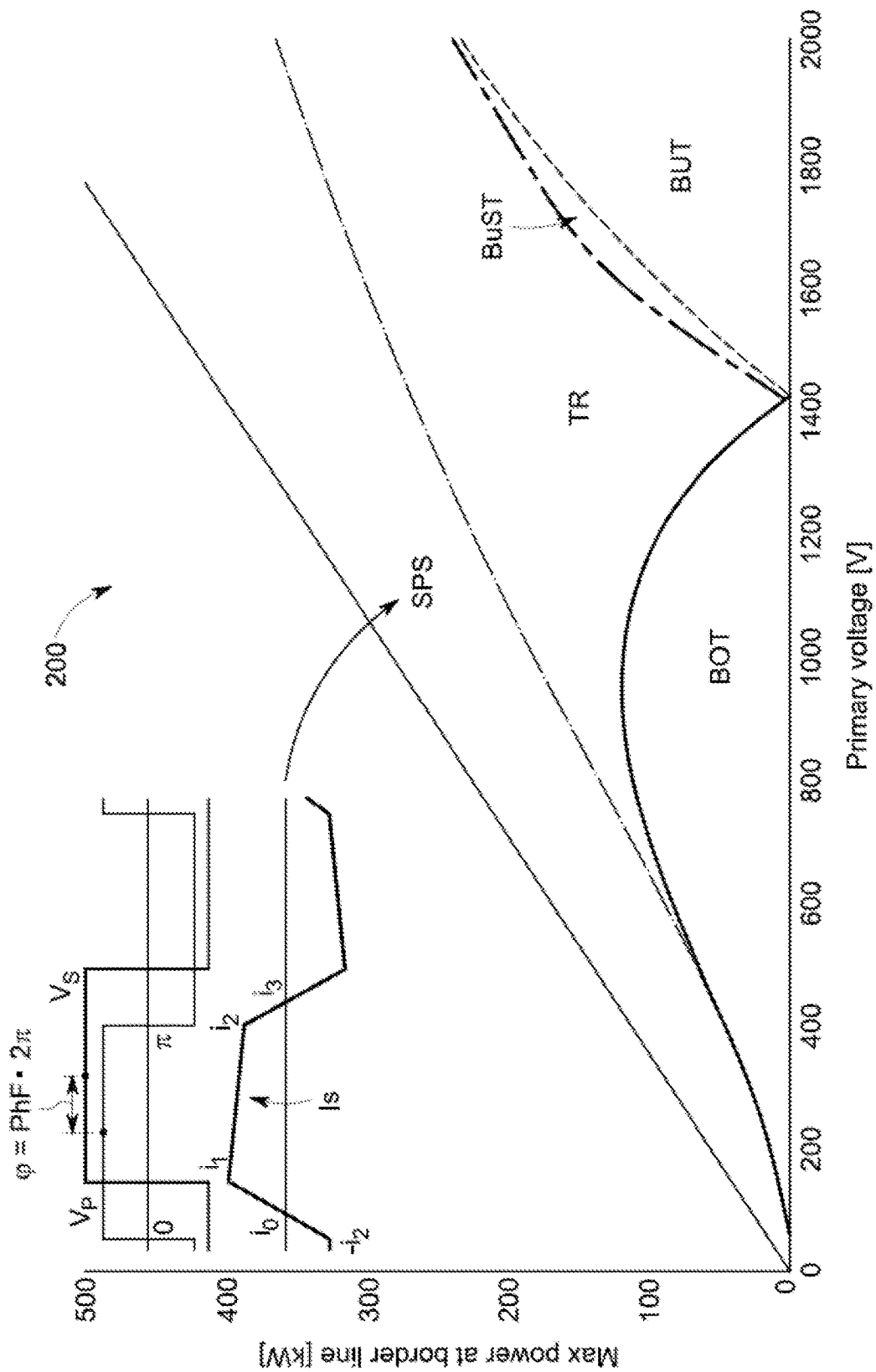
FIG. 2 shows a switching mode map and an exemplary mode graph SPS switching implemented in the power converter shown in FIG. 1.

FIG. 2 shows a "mode graph" of exemplary waveforms of Vp (DC voltage applied from primary link 132 across primary transformer winding 123), Vs (DC voltage applied from secondary link 134 across secondary transformer winding 125), and Is (current flowing through the primary transformer winding 125) for a particular implementation of SPS switching. FIG. 2 also shows an exemplary switching mode map 200, of a type further discussed below with reference to FIGS. 5-8. Referring to the mode graphs of FIG. 2, Dp indicates a duration, from time 0 until time .theta.2, when the transformer primary winding 123 is electrically connected with the primary DC link 132; time .theta.1 indicates the starting time of a duration Ds when the transformer secondary winding 125 is electrically connected with the secondary DC link 134; time .pi. (halfway through the switching cycle period 1/fsw_e) indicates the end of the duration Ds.

SPS switching can produce high currents within the converter switches when the output voltage ratio is substantially different from the transformer ratio. Each of the switches 101-108 has characteristic physical limits (e.g., a peak current value), which constrain commutation of the switches. The high currents associated with SPS switching can result in higher conduction and switching losses of the semiconductors, and may even exceed maximum current capabilities of the switches. However, by selecting different switching modes to vary the timing at which Vg1-Vg8 are supplied, the controller 130 can effect commutation of V1 or Vp to enhance operation under parameters not optimal for SPS switching.

Accordingly, aspects of the present invention relate to a generalized control scheme 300 (shown schematically in FIG. 3), which is implemented in hard real time, across a wide voltage and power range (including power flow reversal), to select one of a plurality of switching modes in response to a change or changes in one or more measured electrical parameters including Vp_fbk (DC voltage across primary link 132) or Vs_fbk (DC voltage across secondary link 134).

"Hard real time," in context of the instant description, indicates a constraint to select a switching mode within a single switching cycle after a change of relevant parameters, where typical values (for example) of switching frequency "fsw," for practical implementations of dual active bridge power converters, are between about 400 and about 20,000 Hz. As used herein, the terms "substantially," "generally," and "about" indicate conditions within reasonably achievable manufacturing and assembly tolerances, relative to ideal desired conditions suitable for achieving the functional purpose of a component or assembly.

According to embodiments of the present invention, as a step in implementing the generalized control scheme 300 the controller 130 identifies 302 a plurality of system constraints (including, e.g., transformer leakage or stray inductance "Ls" referred to the primary side, transformer turns ratio "n", measured primary DC link voltage "Vp_fbk", switching frequency "fsw_e" in switching cycles/second), which may in some embodiments be stored as digital data in an EEPROM or the like data storage media. The controller 130 also receives 304 a target value "Vs_ref" and a measured value "Vs_fbk" for DC voltage across the secondary link 134. The target value Vs_ref and the measured value Vs_fbk may be continuously, periodically, or intermittently obtained "in real time," i.e. typically not less than once per switching cycle, or more often as appropriate. Unless otherwise specified herein, other target or measured values also are obtained in real time.

Figure 3:
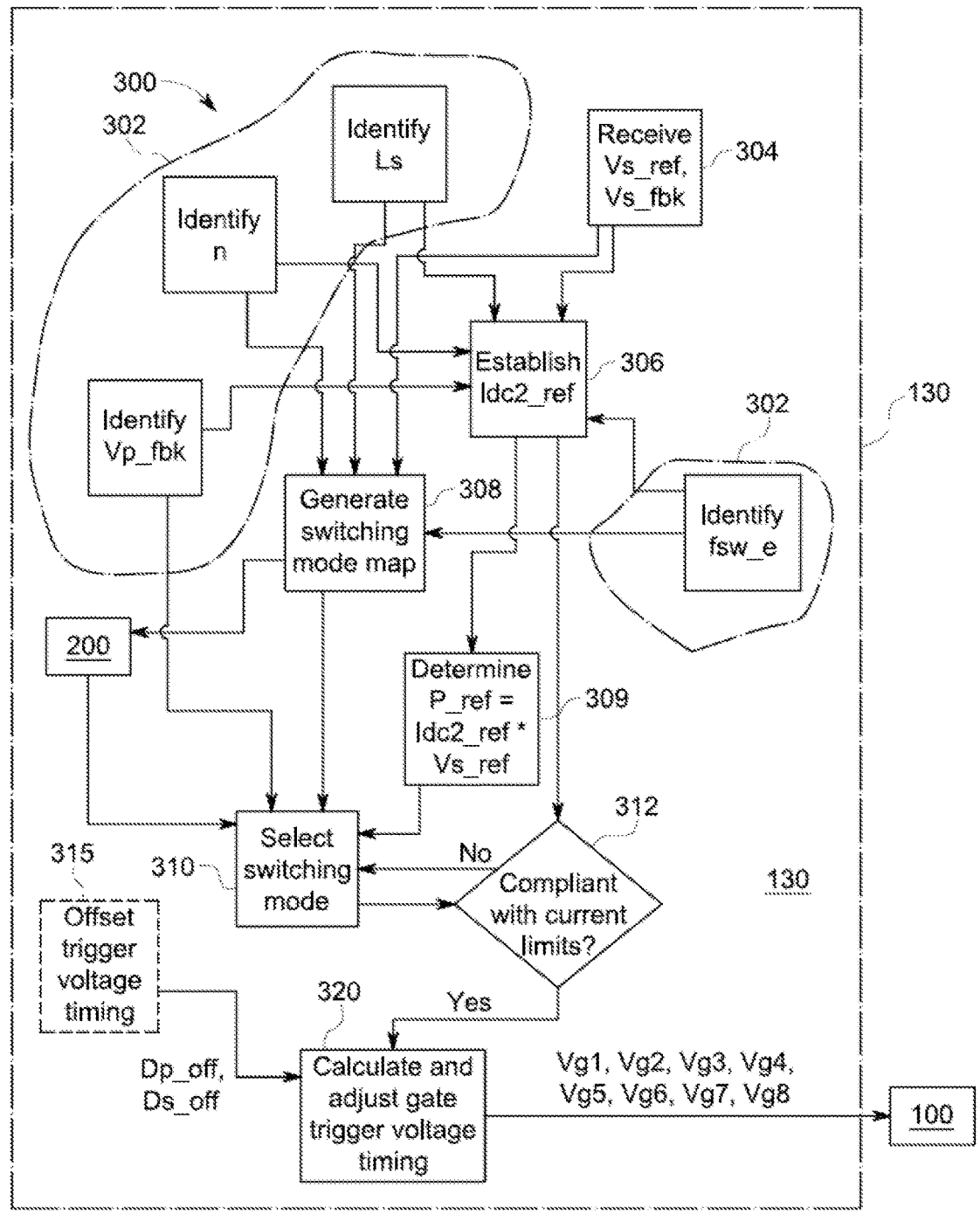
FIG. 3 shows a generalized control scheme implemented by the controller shown in FIG. 1, according to a first embodiment of the invention.
Figure 4:
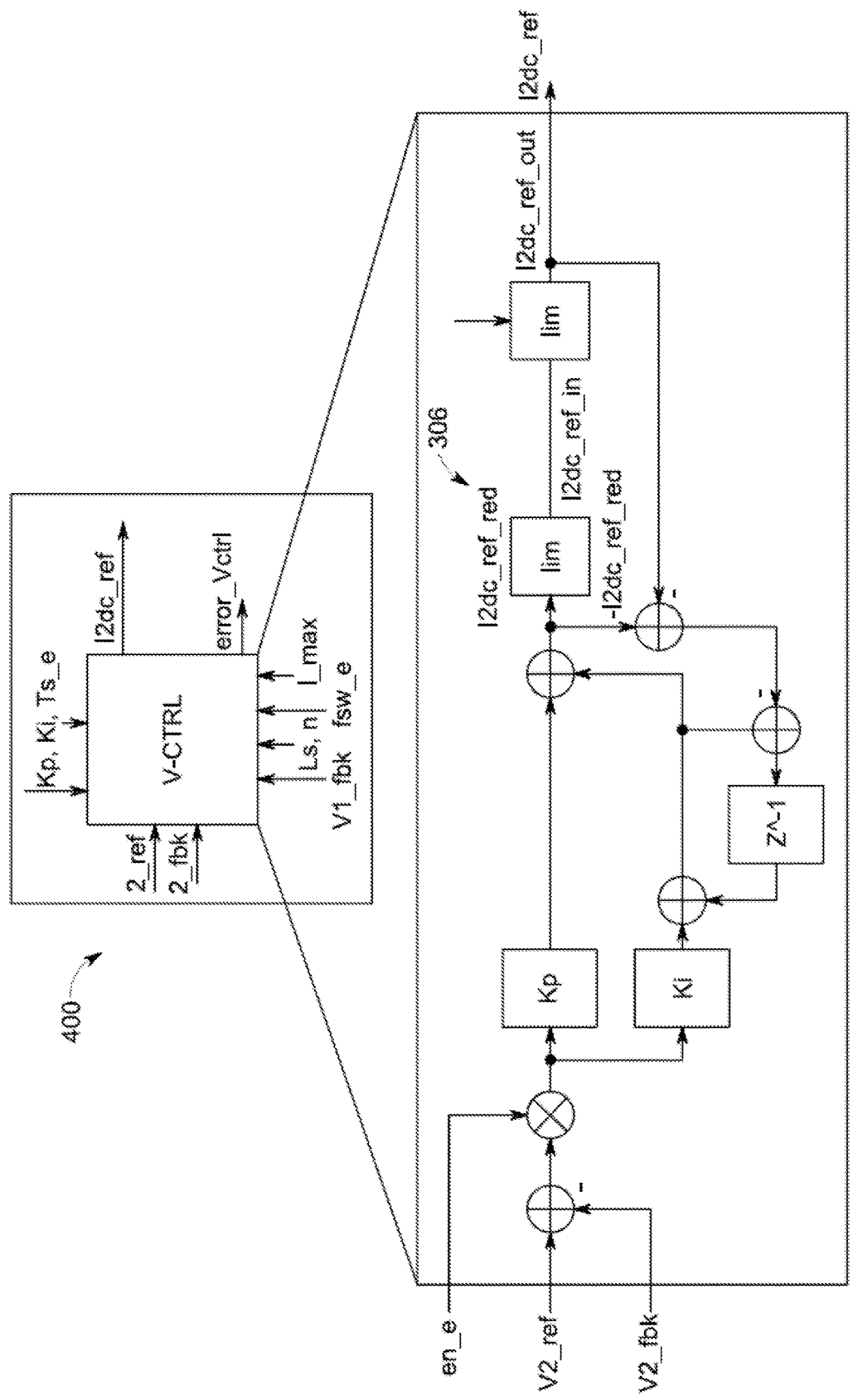
FIG. 4 shows a voltage controller implemented in the controller shown in FIG. 1, according to a first embodiment of the invention.

Based on the system constraints and the received values, the controller 130 establishes 306 a target value "Idc2_ref" for current to be supplied at the secondary DC link 134. FIG. 4 illustrates a PI (proportional-integral) voltage controller 400 that is configured to establish 306 I2dc_ref, based on comparison of target secondary link voltage Vs_ref to measured secondary link voltage Vs_fbk, in consideration of switch current limits. The voltage controller 400 receives variable input signals including a measured value Vs_fbk of DC load voltage, a target value Vs_ref for DC load voltage, and also receives fixed parameters such as switching frequency fsw_e and control coefficients Kp, Ki, transformer leakage inductance Ls, transformer turns ratio n, and a current cap (physical limit of the switches 101-108) I_max. Based on those various inputs, the voltage controller 400 establishes 306 a target value of DC load current, Idc2_ref, as shown in FIG. 3. The voltage controller 400 may also incorporate flux balance control (not shown). By updating Idc2_ref and Vs_ref, the controller 400 maintains 309 a target value "P_ref" for net power transfer.

Figure 5:
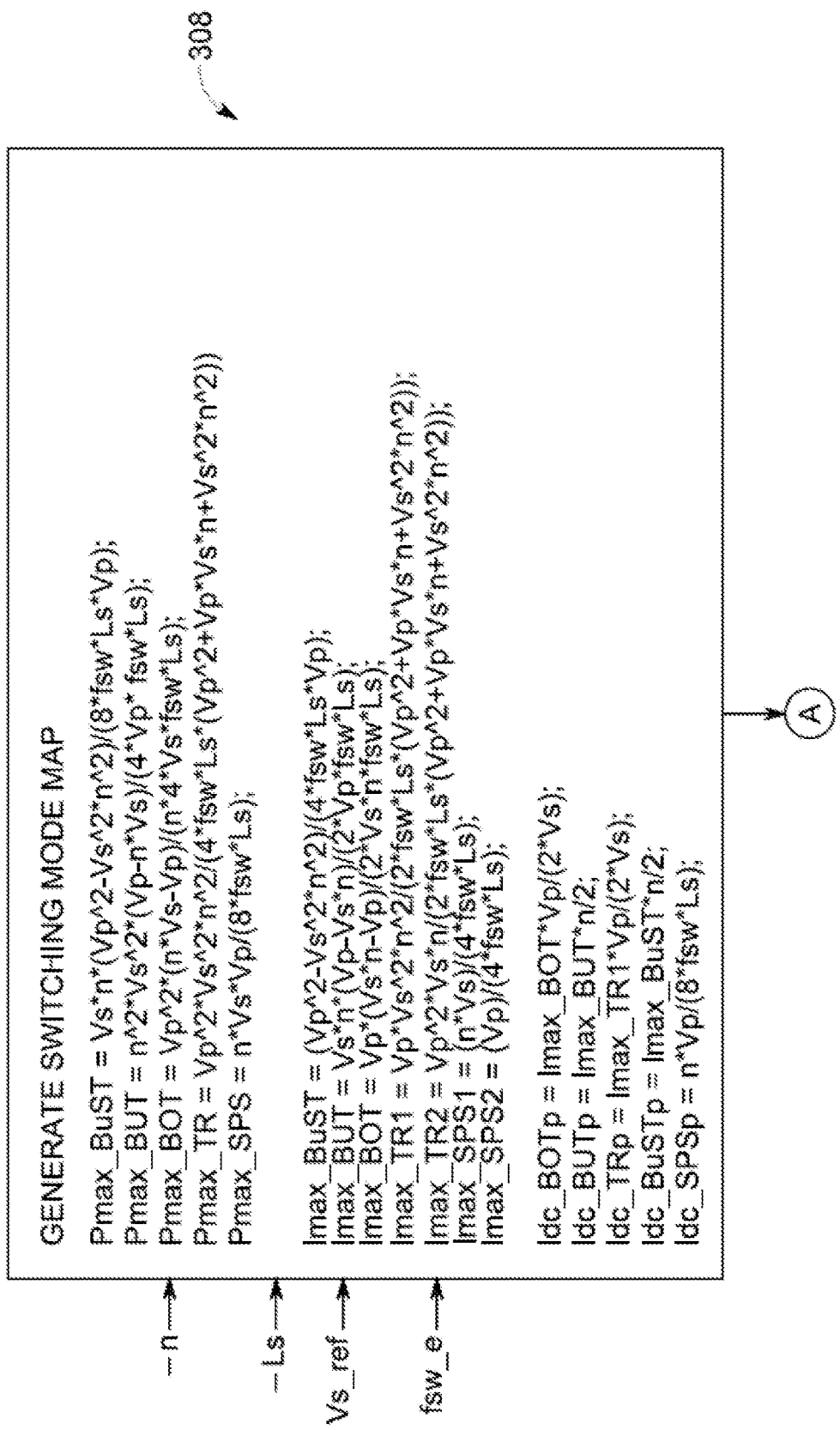
FIG. 5 shows equations implemented by the controller shown in FIG. 1 to generate a switching mode map.

At the same time, or in parallel, the controller 130 also generates 308 a switching mode map based on system parameters {Vs_ref, Vp_fbk, etc.}, according to equations 510 as shown in FIG. 5. FIGS. 6-9 show exemplary switching mode maps 600, 700, 800, 900 for various values of Vs_ref. Each switching mode map 600 etc. subdivides a plane of Vp_fbk/P_ref coordinates into subareas or switching mode regions, each region corresponding to a particular switching mode. Vp_fbk/P_ref coordinates are typical because targeted net power transfer "P_ref" is the parameter of greatest interest, and can be determined 309 according to:

$$P\_ref = Vs\_ref \times Idc2\_ref.$$

Figure 10:
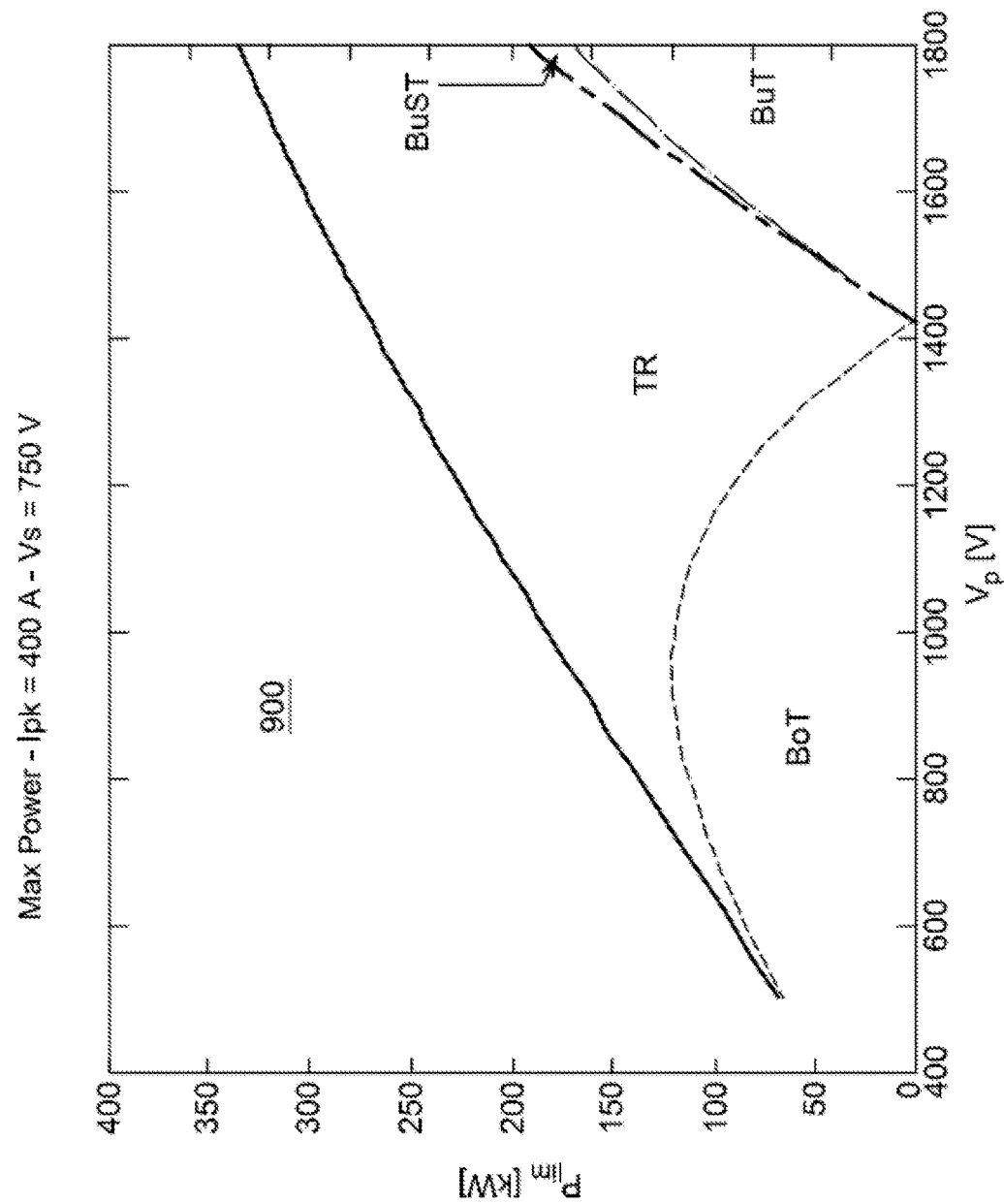
FIG. 10 shows switching mode maps for diverse values of secondary link DC voltage, according to an embodiment of the invention.
Figure 11:
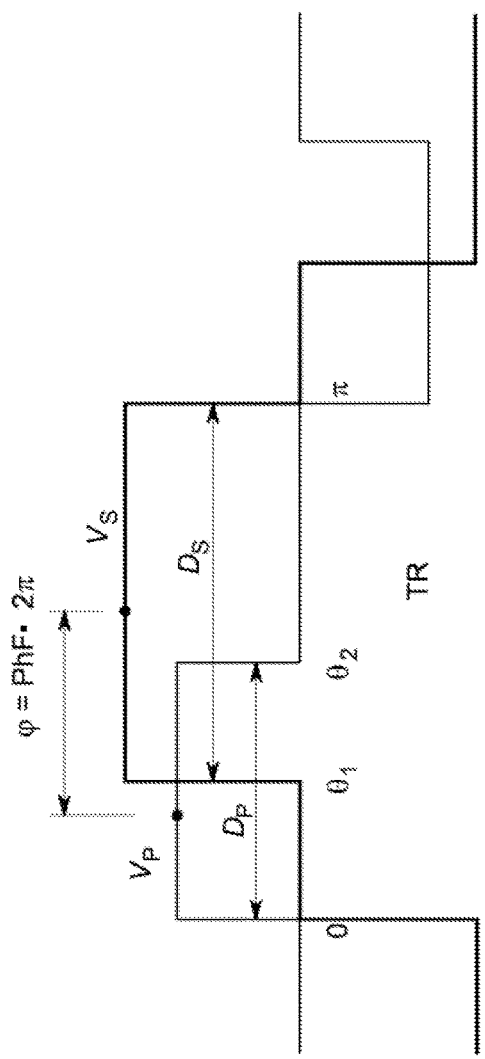
FIG. 11 shows a mode graph of diverse switching modes selectable by the controller from the switching maps shown in FIGS. 5-9.
Figure 12:
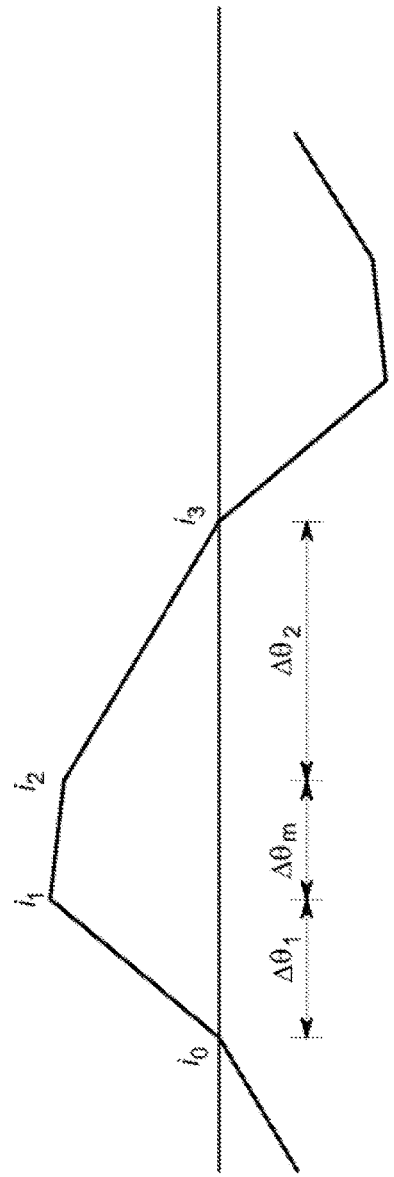
FIG. 12 shows a mode graph of diverse switching modes selectable by the controller from the switching maps shown in FIGS. 5-9.
Figure 13:
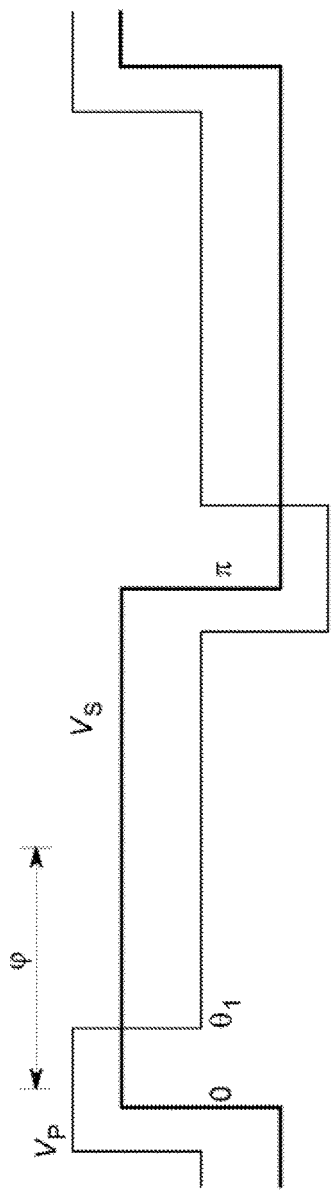
FIG. 13 shows a mode graph of diverse switching modes selectable by the controller from the switching maps shown in FIGS. 5-9.
Figure 14:
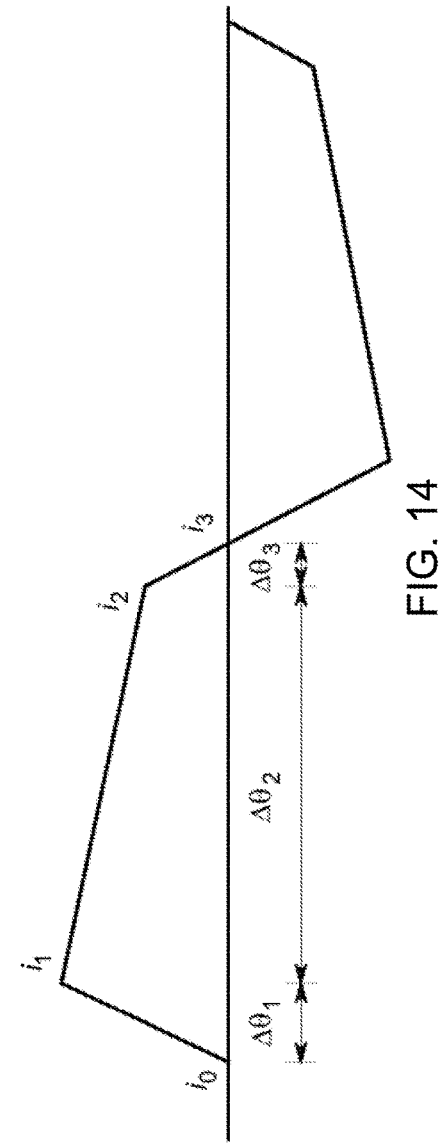
FIG. 14 shows a mode graph of diverse switching modes selectable by the controller from the switching maps shown in FIGS. 5-9.

In exemplary embodiments, the switching modes include: a "triple phase shift trapezoidal" ("TR") mode, in which the primary and secondary bridges 120, 122 are triggered to produce Vp, Vs, and I2 waveforms as shown in the mode graph of FIG. 10; a "triple phase shift buck saturated trapezoidal" ("BuST") mode, as shown in the mode graph of FIG. 11; a "triple phase shift boost triangular" ("BoT") mode, as shown in the mode graph of FIG. 12; and a "triple phase shift buck triangular" ("BuT") mode, as shown in the mode graph of FIG. 13. For a switching mode map corresponding to a given value of Vs, an upper boundary of each switching mode region is defined by a maximum power Pmax that is achievable using that switching mode. FIG. 5 shows equations for calculating Pmax, for each of the switching modes; for generating 308 a switching mode map based on Pmax values; and for identifying 310 an optimal switching mode region.

Figure 6:
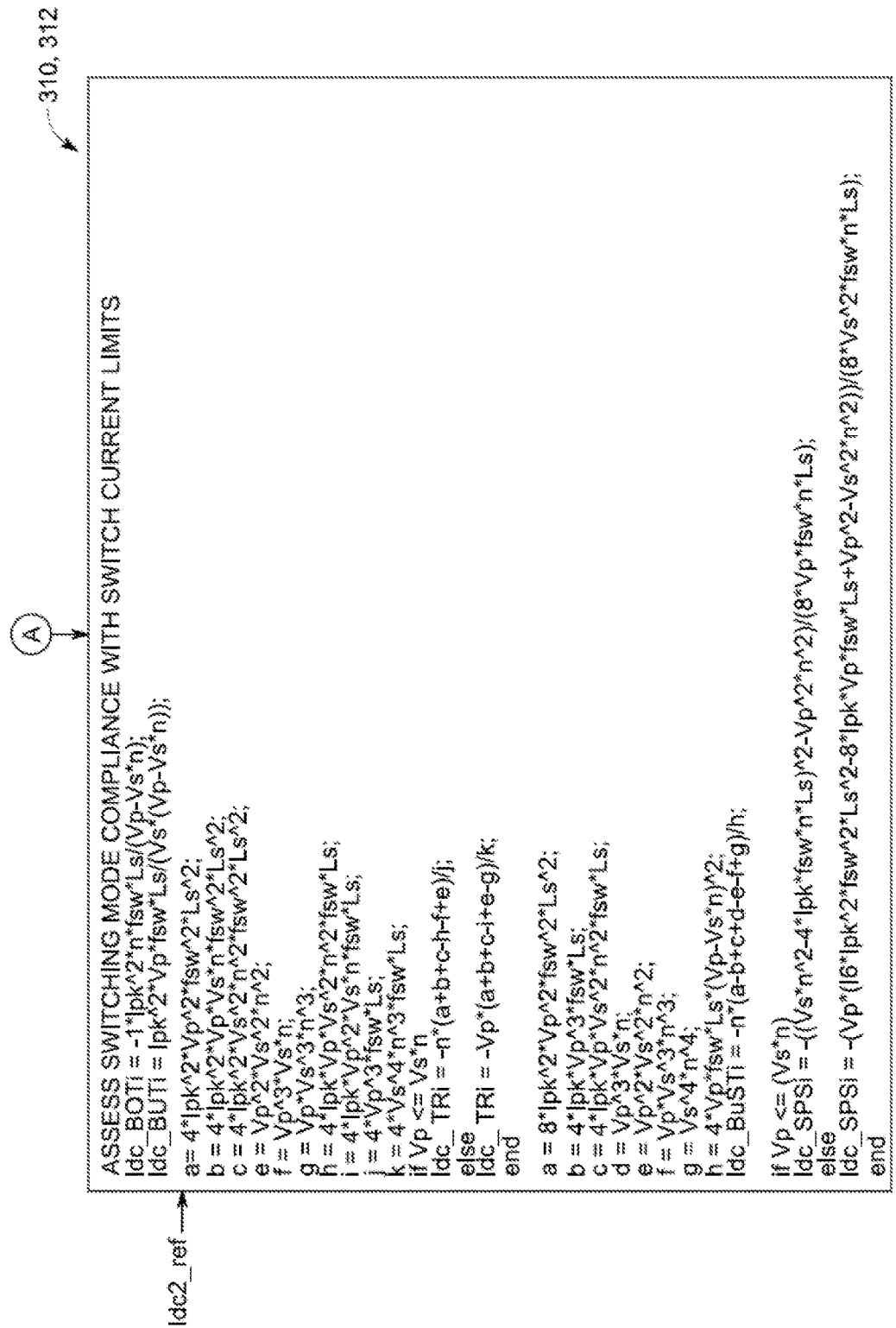
FIG. 6 shows equations implemented by the controller shown in FIG. 1 to generate the switching mode map.
Figure 7:
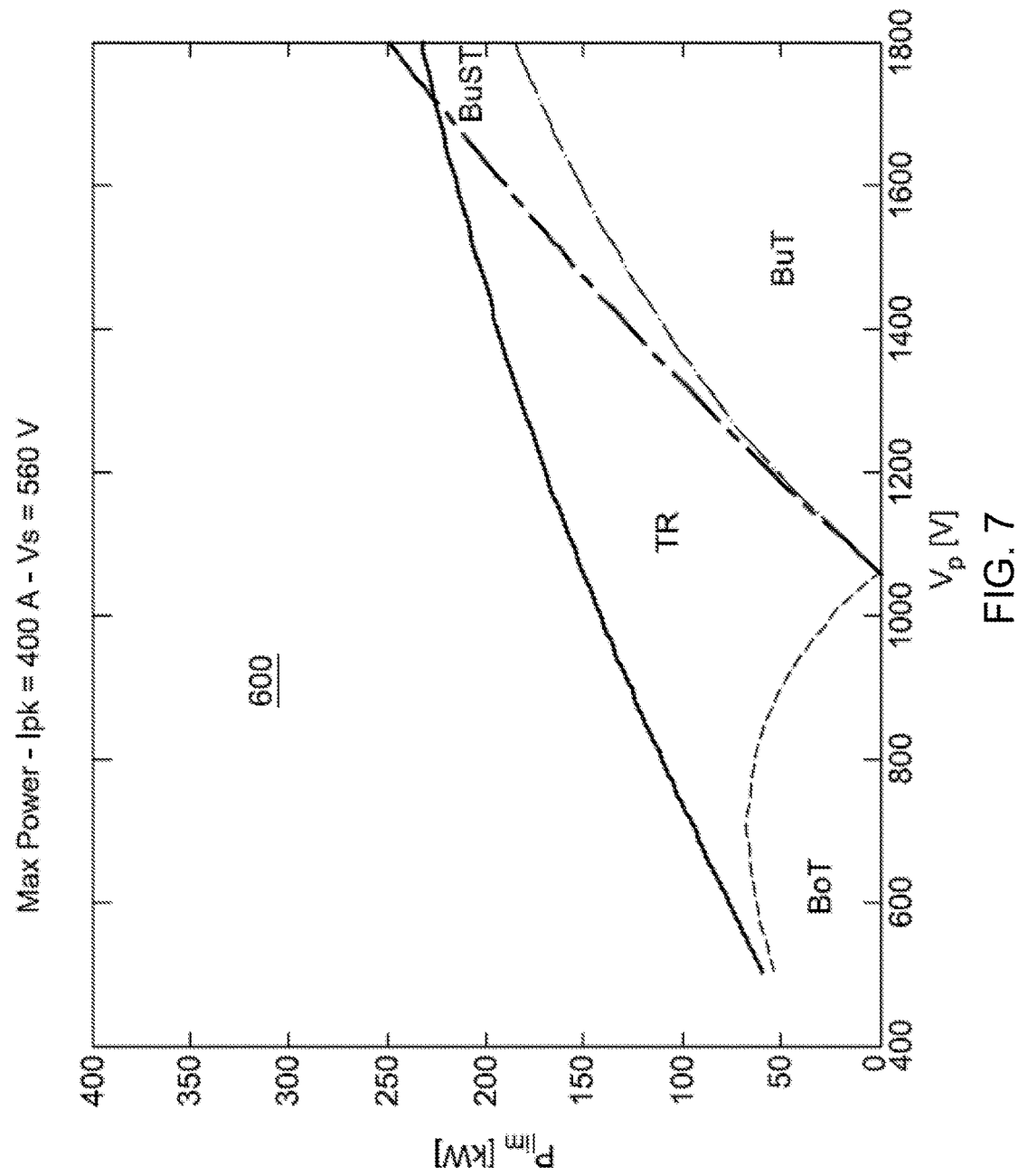
FIG. 7 shows switching mode maps for diverse values of secondary link DC voltage, according to an embodiment of the invention.
Figure 8:
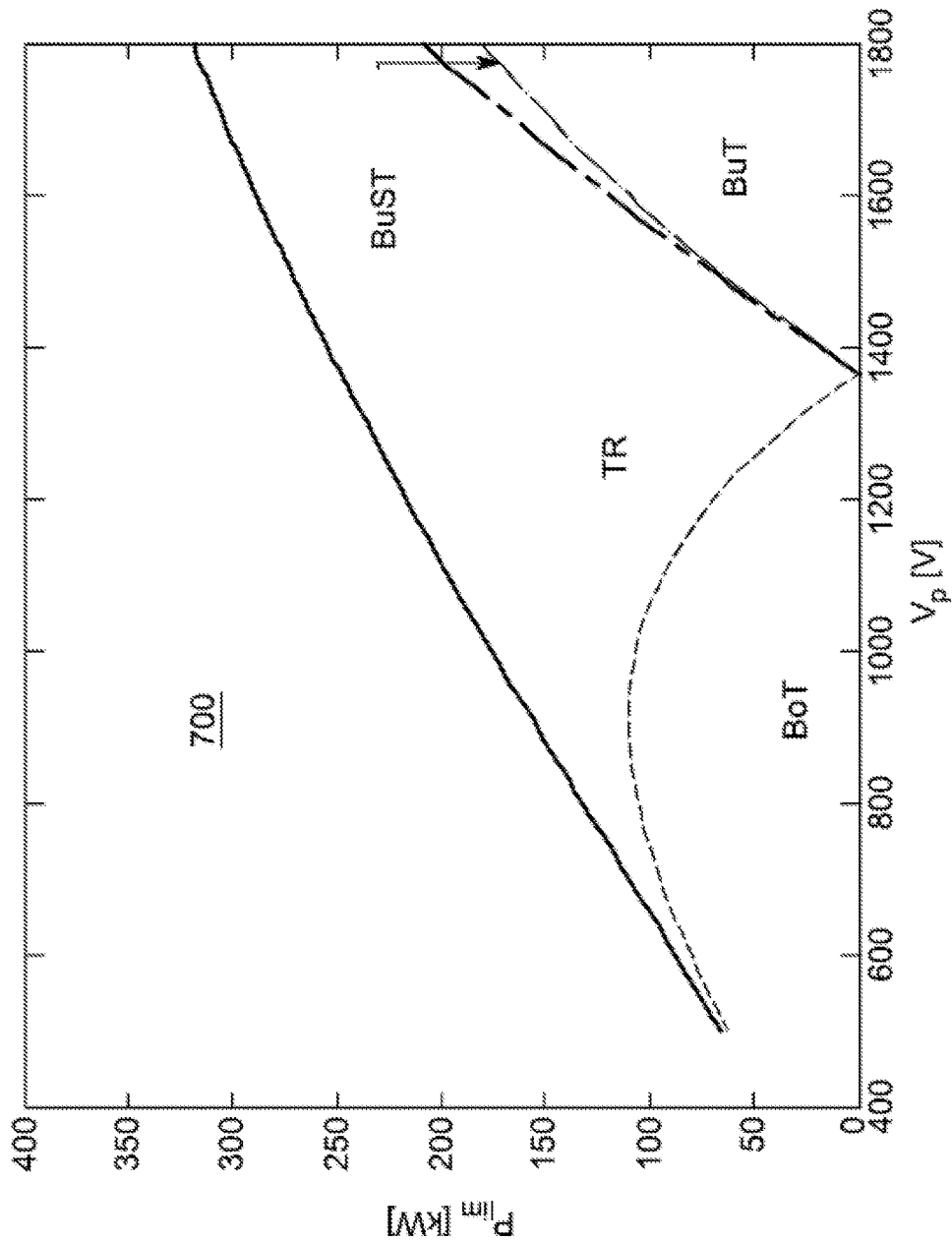
FIG. 8 shows switching mode maps for diverse values of secondary link DC voltage, according to an embodiment of the invention.
Figure 9:
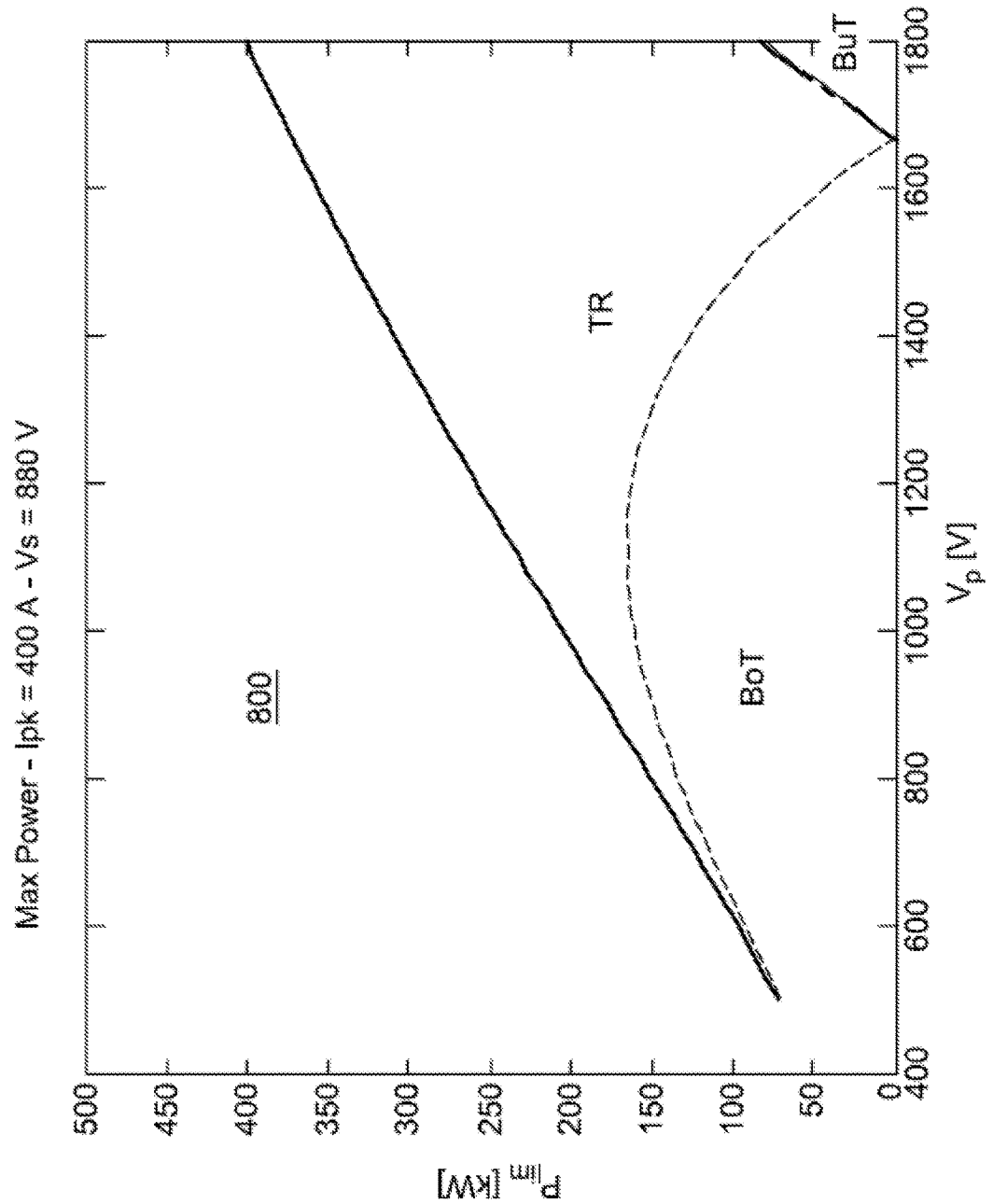
FIG. 9 shows switching mode maps for diverse values of secondary link DC voltage, according to an embodiment of the invention.

Referring to FIGS. 3, 5, and 6, the controller 130 uses the established values of {Vp_fbk, P_ref} to select 310 from the generated switching mode map an optimal algorithm or switching mode (SPS, TR, BoT, BuT, or BuST) for calculating 320 gate trigger voltage timing based on system parameters {Vp_fbk, Vs_ref, P_ref}. For example, the controller 130 generates 308 the entire mode map, and uses {Vp_fbk, Idc2_ref} to locate 312 a point {Vp_fbk, P_ref} on the map and to thereby select 310 the switching mode in which that point is found. Alternatively, the controller 130 may first identify a general region of the point {Vp_fbk, P_ref} (e.g., to the left or right of an "equal" voltage line Vp_fbk=Vs_fbk/n). Having identified a general region, the controller 130 then may generate only that part of a switching mode map that is within the general region (e.g., if {Vp_fbk, P_ref} is to the left of the equal voltage line, then the controller will generate Pmax boundaries only for BoT and TR switching modes; BuT and BuST would not be found to the left of this line). By comparing the point {Vp_fbk, P_ref} to the generated subset of Pmax boundaries, the controller 130 then can select 310 which switching mode region contains the point.

Figure 15:
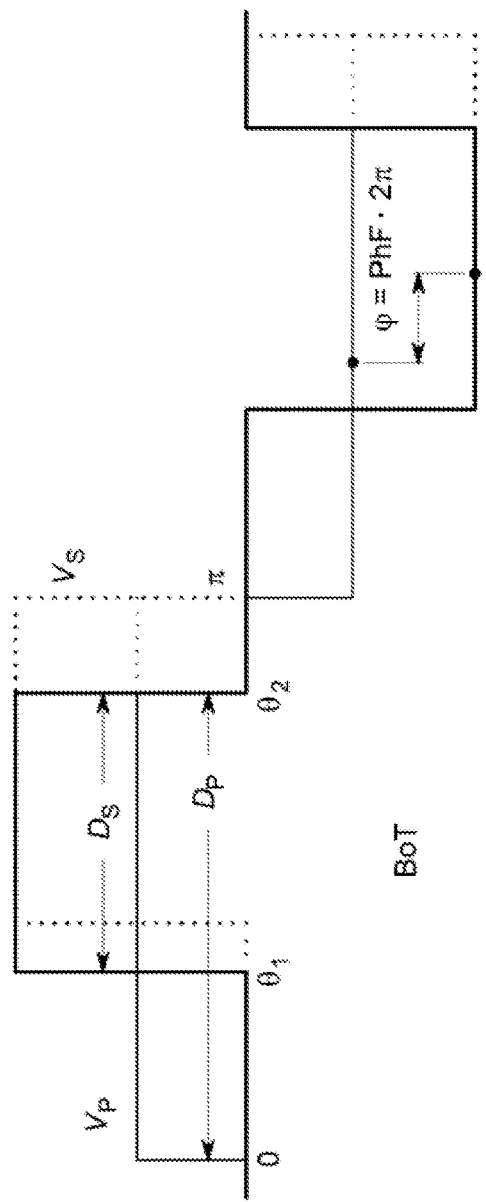
FIG. 15 shows a mode graph of diverse switching modes selectable by the controller from the switching maps shown in FIGS. 5-9.
Figure 16:
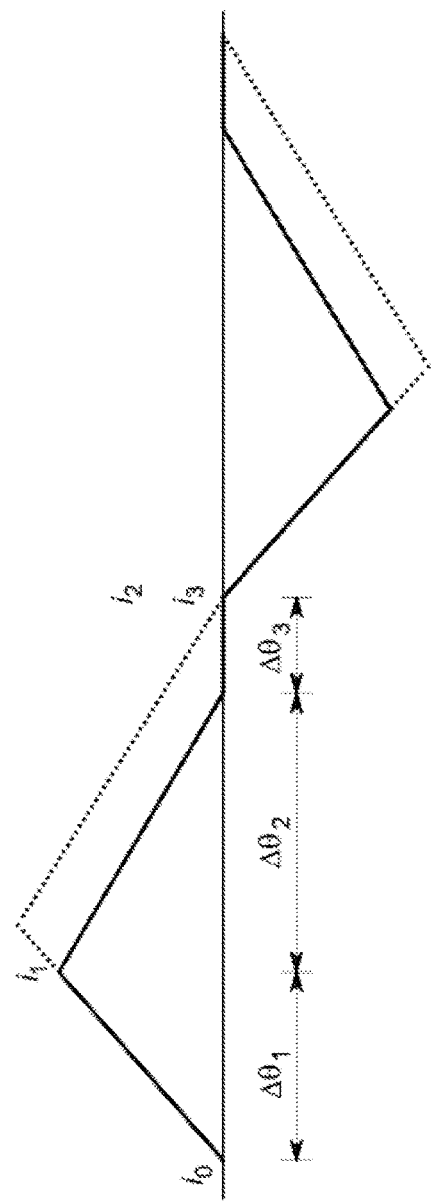
FIG. 16 shows a mode graph of diverse switching modes selectable by the controller from the switching maps shown in FIGS. 5-9.
Figure 17:
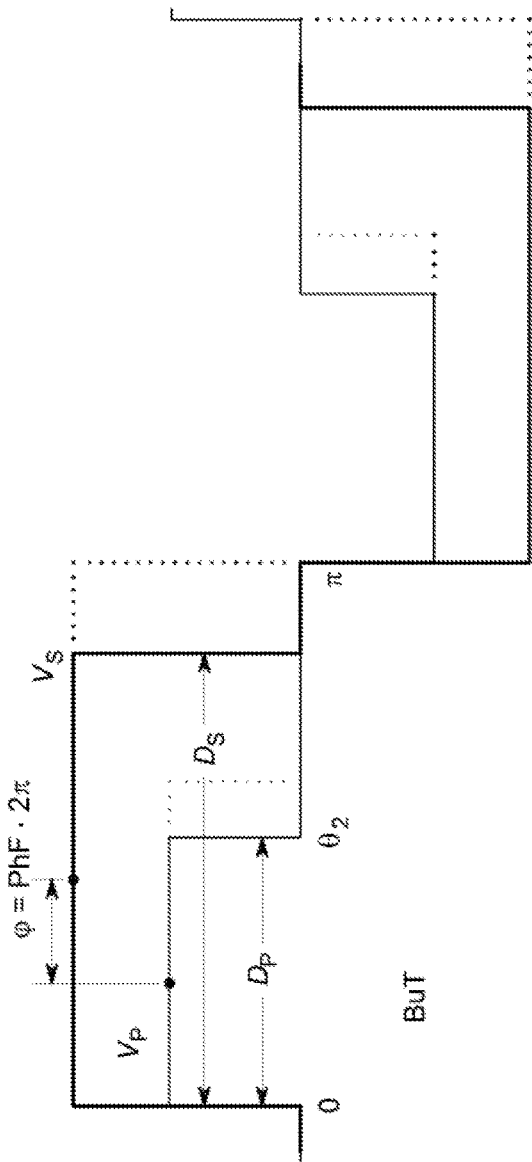
FIG. 17 shows a mode graph of diverse switching modes selectable by the controller from the switching maps shown in FIGS. 5-9.
Figure 18:
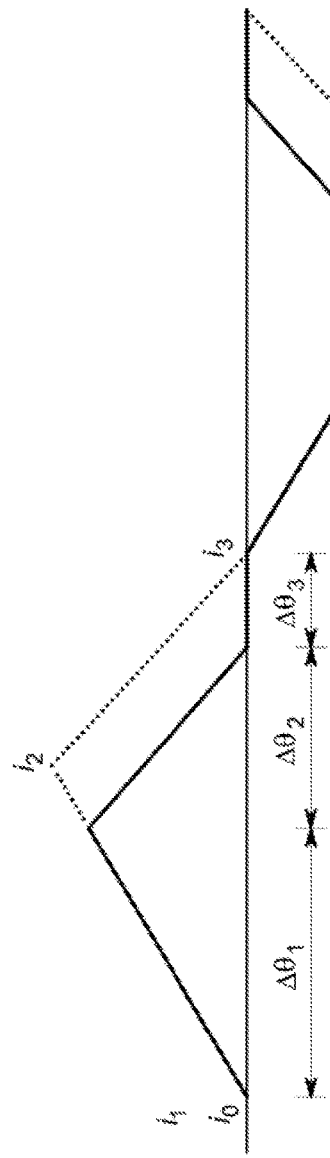
FIG. 18 shows a mode graph of diverse switching modes selectable by the controller from the switching maps shown in FIGS. 5-9.
Figure 21:
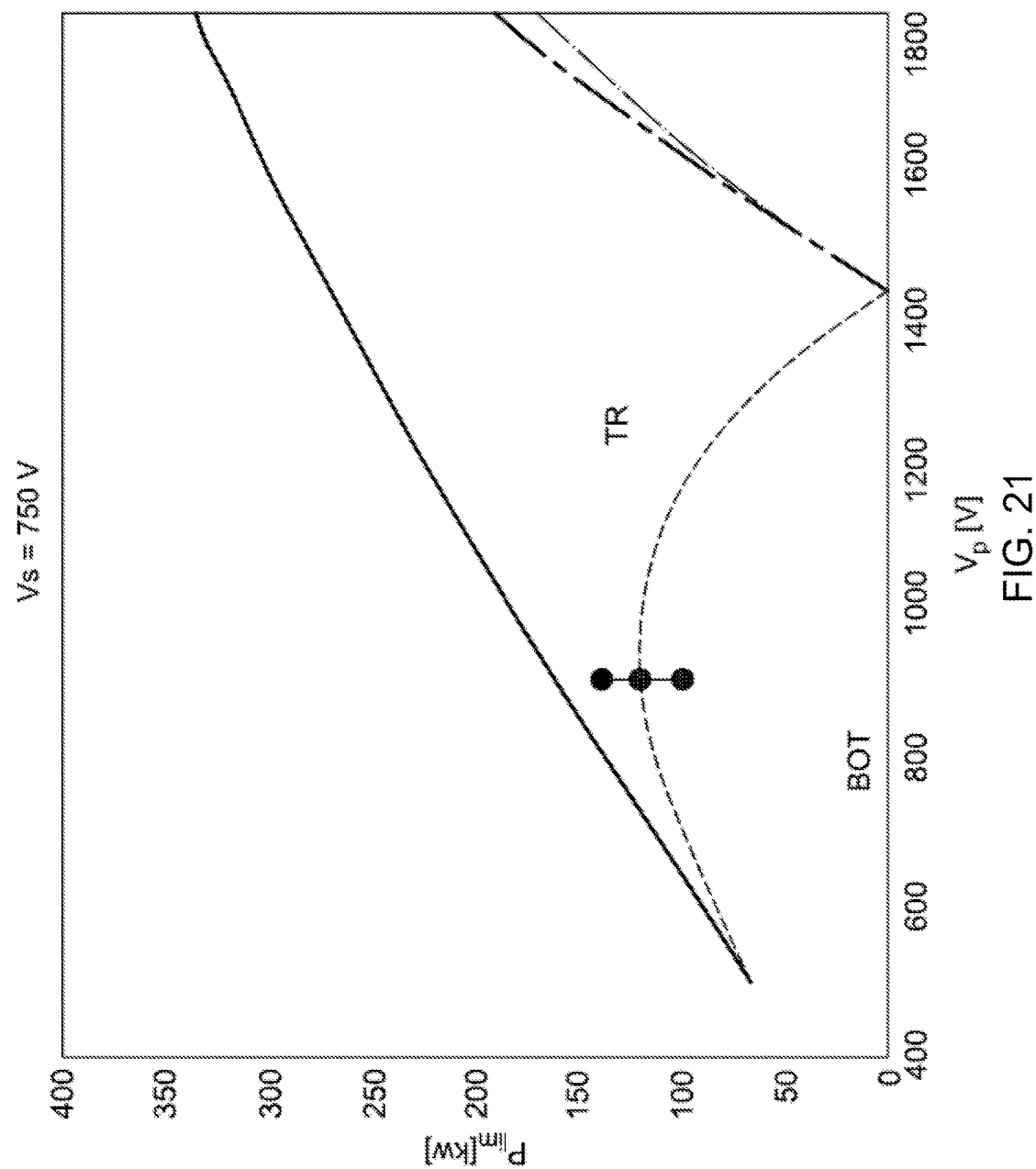
FIG. 21 shows a mode graphs of a transition between TR and BoT switching modes, according to a first embodiment of the invention.
Figure 22:
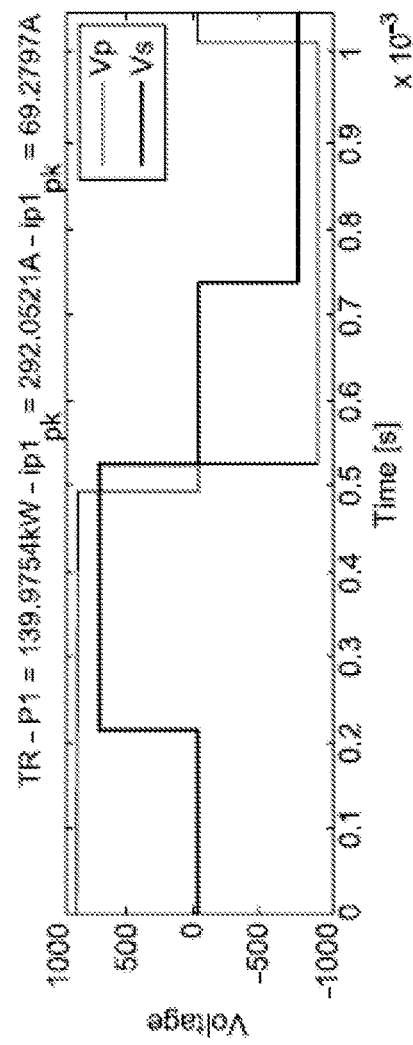
FIG. 22 shows a mode graph of a transition between TR and BoT switching modes, according to a first embodiment of the invention.
Figure 23:
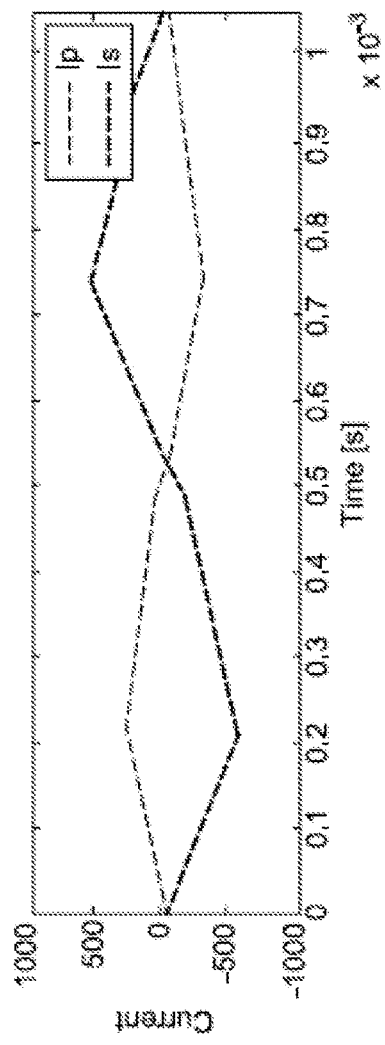
FIG. 23 shows a mode graph of a transition between TR and BoT switching modes, according to a first embodiment of the invention.
Figure 24:
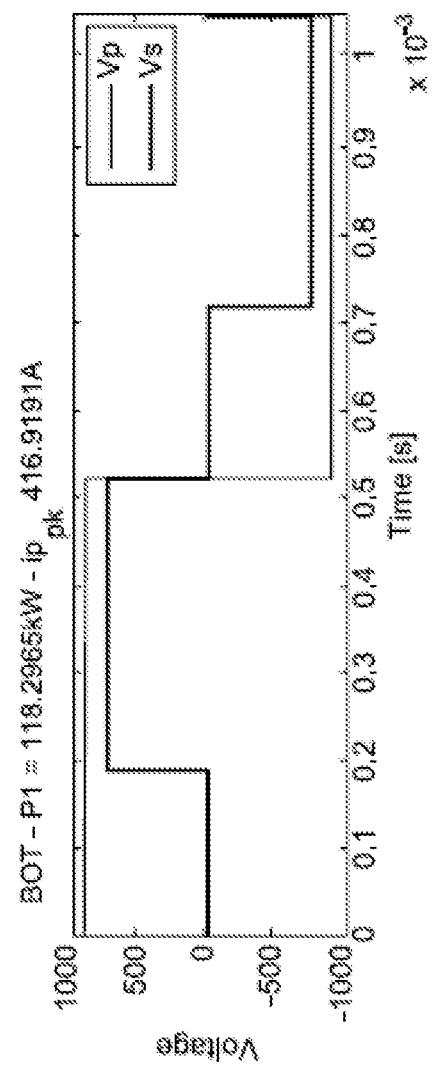
FIG. 24 shows a mode graph of a transition between TR and BoT switching modes, according to a first embodiment of the invention.
Figure 25:
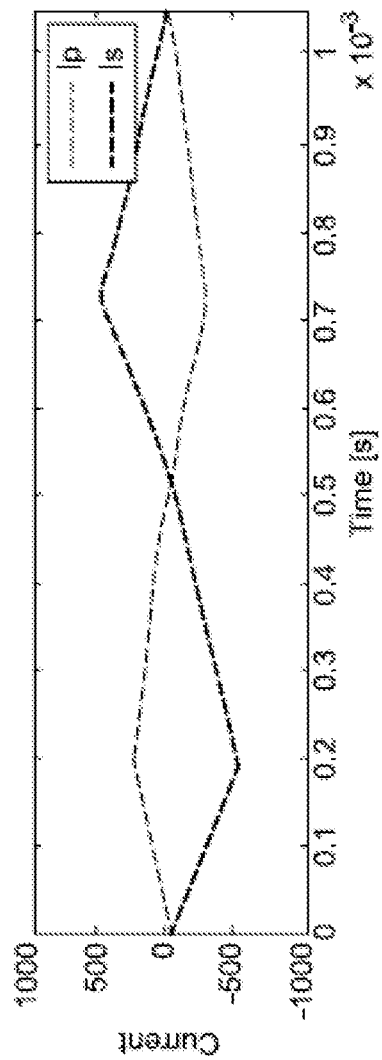
FIG. 25 shows a mode graph of a transition between TR and BoT switching modes, according to a first embodiment of the invention.
Figure 26:
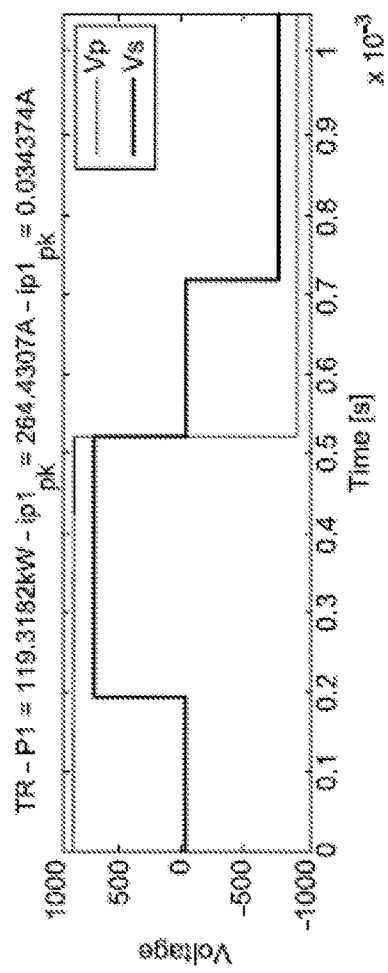
FIG. 26 shows a mode graph of a transition between TR and BoT switching modes, according to a first embodiment of the invention.
Figure 27:
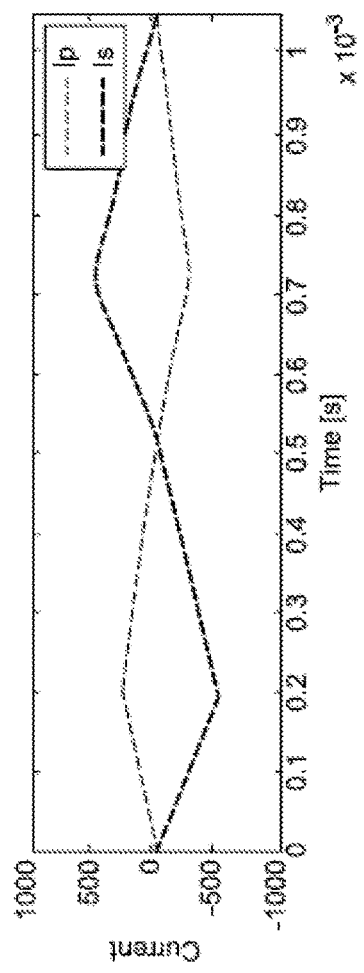
FIG. 27 shows a mode graph of a transition between TR and BoT switching modes, according to a first embodiment of the invention.
Figure 28:
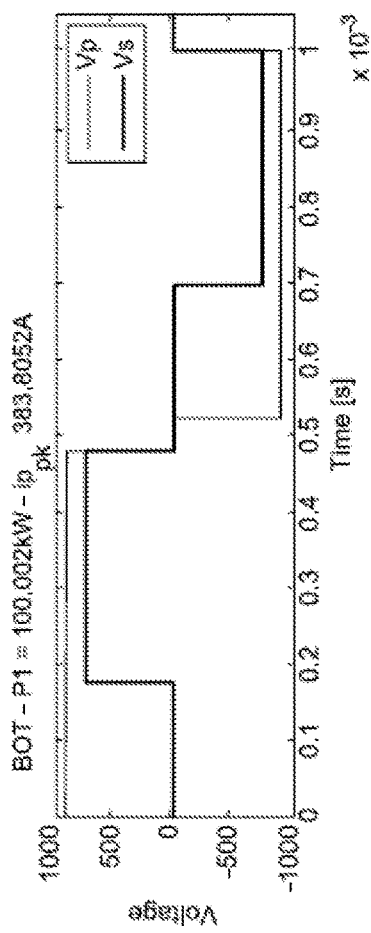
FIG. 28 shows a mode graph of a transition between TR and BoT switching modes, according to a first embodiment of the invention.
Figure 29:
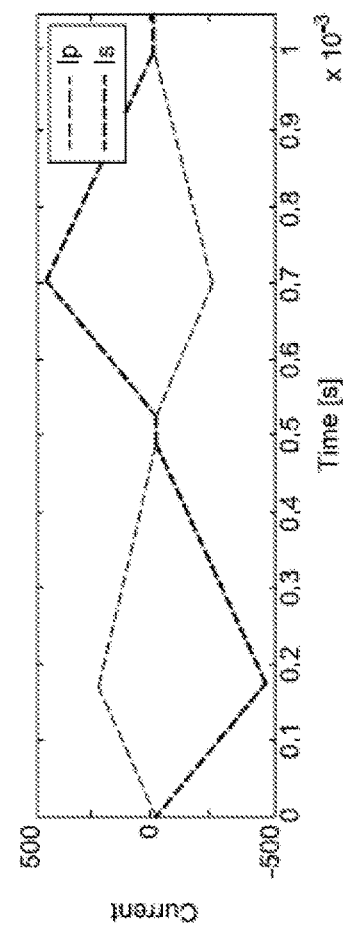
FIG. 29 shows a mode graph of a transition between TR and BoT switching modes, according to a first embodiment of the invention.
Figure 30:
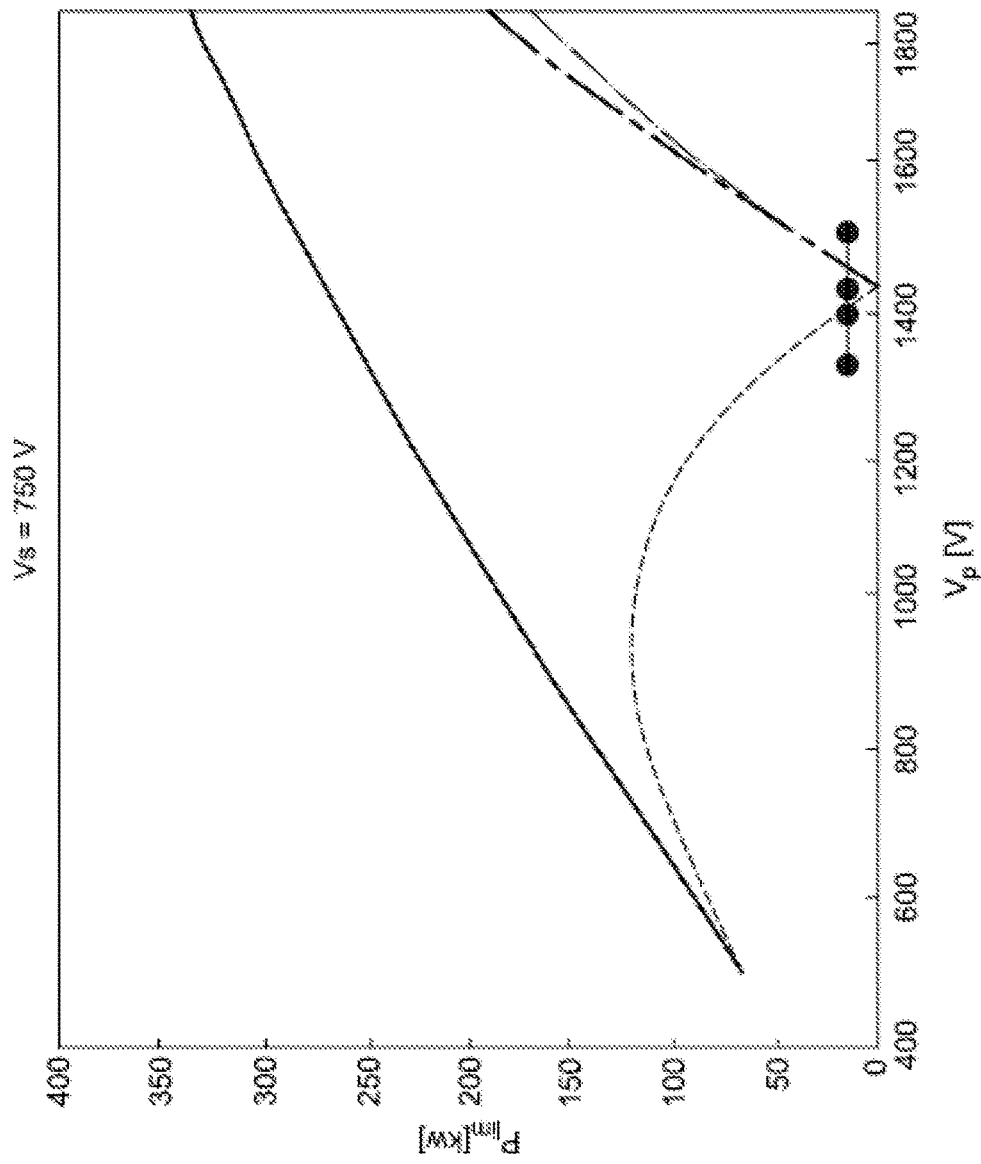
FIG. 30 shows a mode graph of a transition between BoT, TR, and BuT switching modes, according to a first embodiment of the invention.
Figure 31:
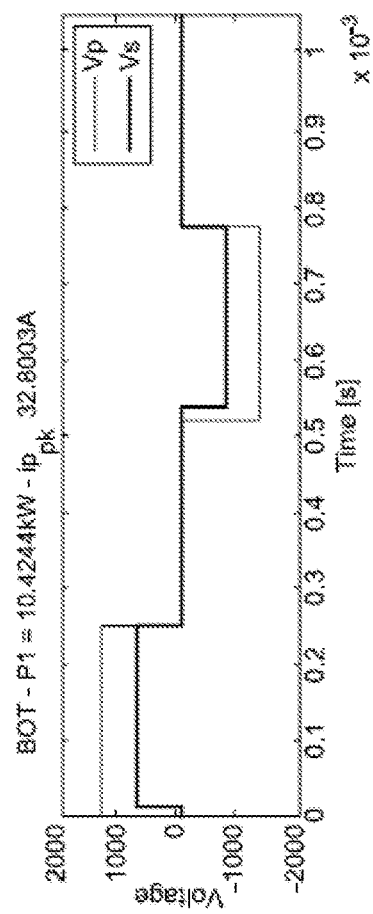
FIG. 31 shows a mode graph of a transition between BoT, TR, and BuT switching modes, according to a first embodiment of the invention.
Figure 32:
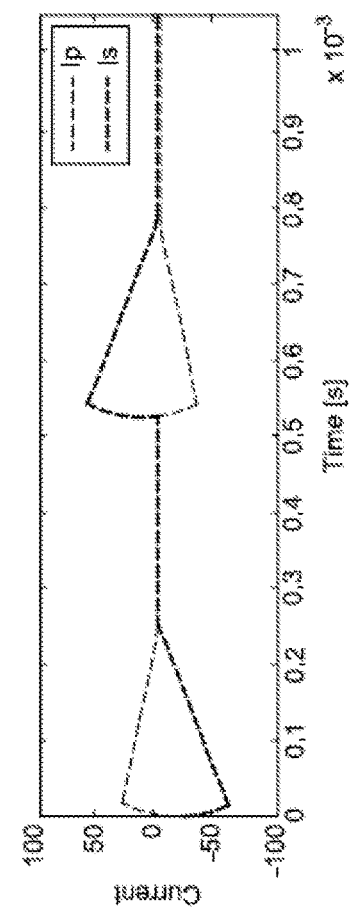
FIG. 32 shows a mode graph of a transition between BoT, TR, and BuT switching modes, according to a first embodiment of the invention.
Figure 33:
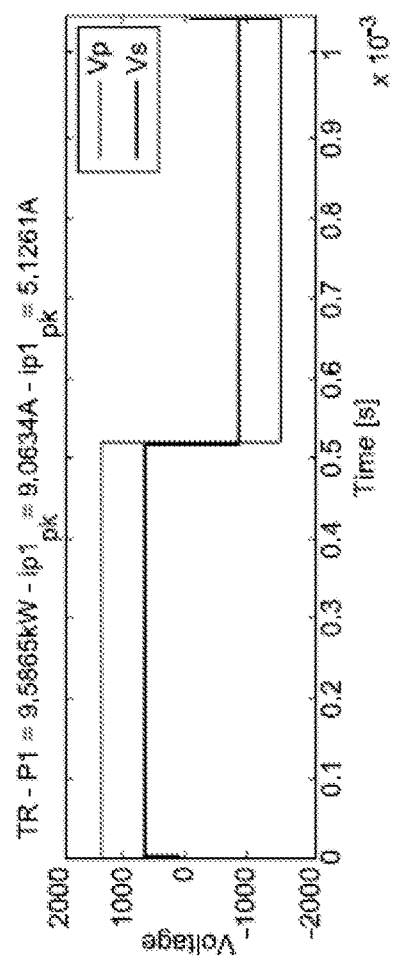
FIG. 33 shows a mode graph of a transition between BoT, TR, and BuT switching modes, according to a first embodiment of the invention.
Figure 34:
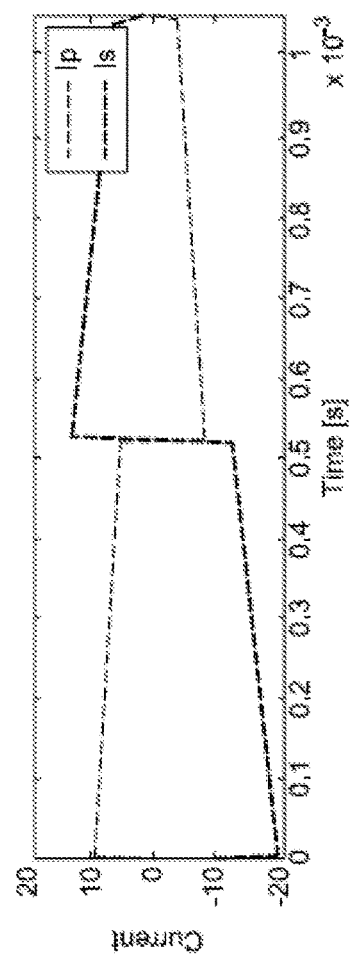
FIG. 34 shows a mode graph of a transition between BoT, TR, and BuT switching modes, according to a first embodiment of the invention.
Figure 35:
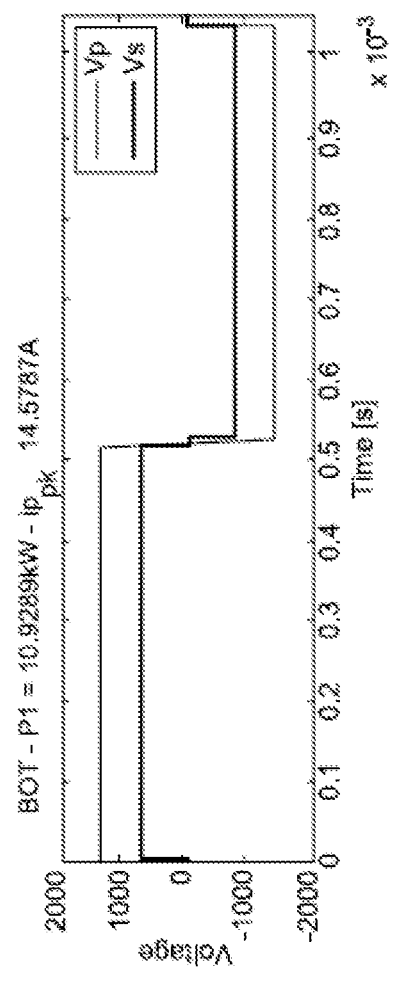
FIG. 35 shows a mode graph of a transition between BoT, TR, and BuT switching modes, according to a first embodiment of the invention.
Figure 36:
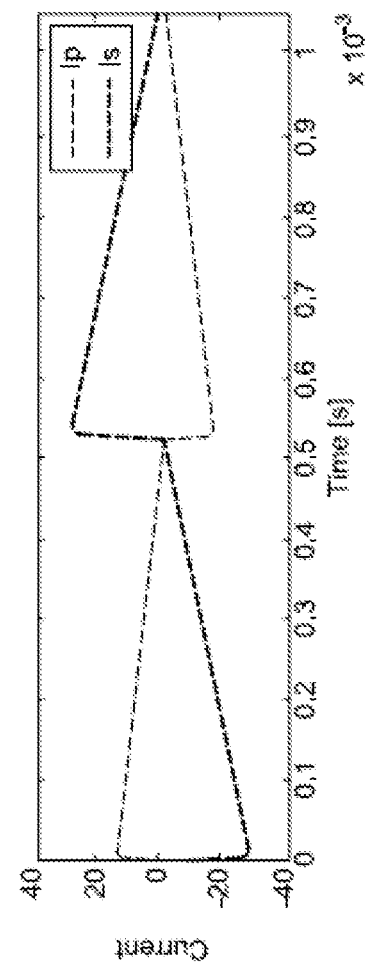
FIG. 36 shows a mode graph of a transition between BoT, TR, and BuT switching modes, according to a first embodiment of the invention.
Figure 37:
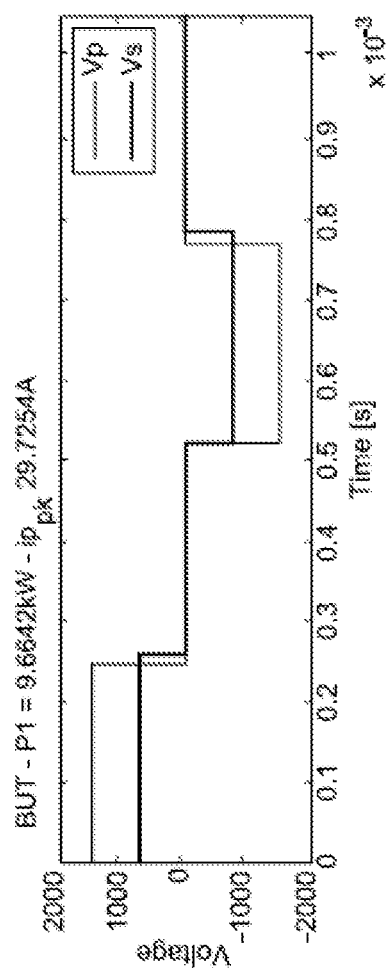
FIG. 37 shows a mode graph of a transition between BoT, TR, and BuT switching modes, according to a first embodiment of the invention.
Figure 38:
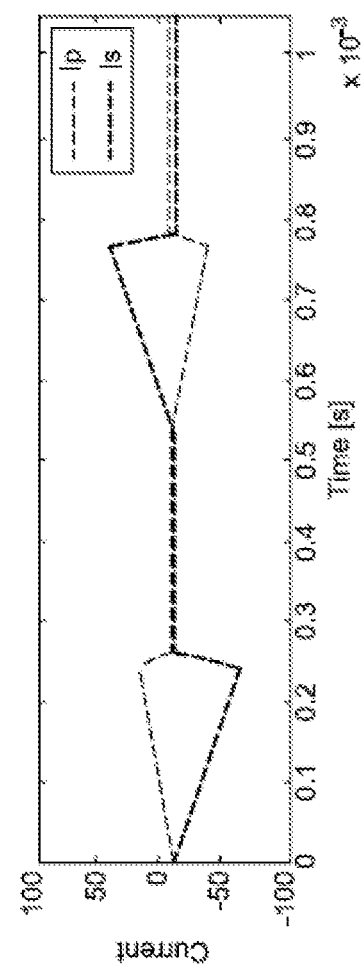
FIG. 38 shows a mode graph of a transition between BoT, TR, and BuT switching modes, according to a first embodiment of the invention.

Notably, several of the switching modes are "compatible," which means that under the parameters {Vs_ref, Vp_fbk, P_ref} defining the mode region boundaries, each of the adjacent switching modes produces "borderline waveforms" of Ip and of Is that are identical to the borderline waveforms produced by the other adjacent switching mode under the same set of parameters. For example, BoT, TR, and BuT switching modes are compatible as shown in FIGS. 15-16. Compatibility between the switching modes enables on-the-fly transitions without concern for phase-shifting gate trigger voltage steps. On the other hand, although BuST is not compatible with TR, it is possible to time transitions between these modes so that the gate trigger voltages are removed or applied at zero-current conditions. Indeed, each of the switching modes can be designed such that transformer current is equal to zero amps at the beginning/end of each switching cycle.

Subsequently, the controller 130 calculates 320 gate trigger voltage timing signals Vg1-Vg8, according to a set of trigger voltage timing equations (shown in FIGS. 19 and 20) as defined by the selected switching mode. For each switching mode, the corresponding set of trigger voltage timing equations 320 is defined such that a target DC voltage (Vs_ref) is maintained at the secondary link 134 while currents and voltages across the switches 101-108 do not exceed their characteristic physical limits; and such that, at each boundary with each adjacent switching mode, the trigger voltage timing equations of the adjacent switching modes produce compatible waveforms as discussed above. Based on the calculations 320, the controller 130 then adjusts the gate trigger voltage timing. For example, maximum power flow between the links 132, 134 (via the transformer 124) can be limited to a value that corresponds to a maximum peak value of the transformer current; or to a value that corresponds to a physical limit (e.g., heat dissipation, thermal strain, etc.) of one of the components (e.g., a diode, a switch, etc.).

Optionally, in calculating 320 the gate trigger voltage timing, the controller 130 offsets 315 the gate voltage trigger timing signals by time offsets Dp_off, Ds_off to produce a dc-offset voltage to regulate the offset currents in the transformer. For example, the controller 130 would offset 315 the primary bridge trigger signal waveforms Vg1 . . . Vg4, according to the primary switching offset Dp_Off, and also would offset 315 the secondary trigger signal waveforms Vg5 . . . Vg8, according to the secondary switching offset Ds_Off.

As another option, in at least one of the switching modes, the controller 130 may exchange switching patterns among switches within a bridge on consecutive switching cycles. In other words, during a first switching cycle switch 101 may be switched under current while switch 103 is switched at zero amps; then, during a next switching cycle, switch 101 will be switched at zero amps while switch 103 is switched under current. Such exchange of switching patterns can extend component life by providing thermal "rest" periods.

FIGS. 19 and 20 show equations 321 that are used by the controller 130 for calculating 320 gate trigger voltage timing under each of the SPS, TR, BoT, BuT, or BuST switching modes. Instead of implementing these equations on-the-fly, the controller 130 may instead refer to and interpolate among pre-set lookup tables. Those of ordinary skill will appreciate equivalent modes of calculating gate trigger voltage timing.

In FIGS. 19 and 20, and throughout unless otherwise defined in context, "fsw" represents switching frequency; "Ls" represents the leakage inductance of the transformer; "Vp" or "V1" represents DC supply voltage; "Vs" or "V2" represents DC load voltage; "n" represents transformer windings turns ratio; "Idc_ref" represents a setpoint value of DC load current; "ptDead" represents a design value of transition or "dead" time for each switch in the power converter; "T1" through "T8" refer to switching times of the eight switches in the power converter, in other words, the times when the gate trigger voltages Vg1-Vg8 are applied or removed from the switches; "_ref" indicates a target or setpoint value; "fbk" indicates a measured value.

FIGS. 21 through 29 illustrate a transition from TR switching mode to BOT switching mode, wherein it is apparent the two switching modes produce compatible waveforms at the switching mode boundary conditions. Similarly, FIGS. 30 through 38 illustrate smooth transitions among BOT, TR, and BUT switching modes.

Figure 39:
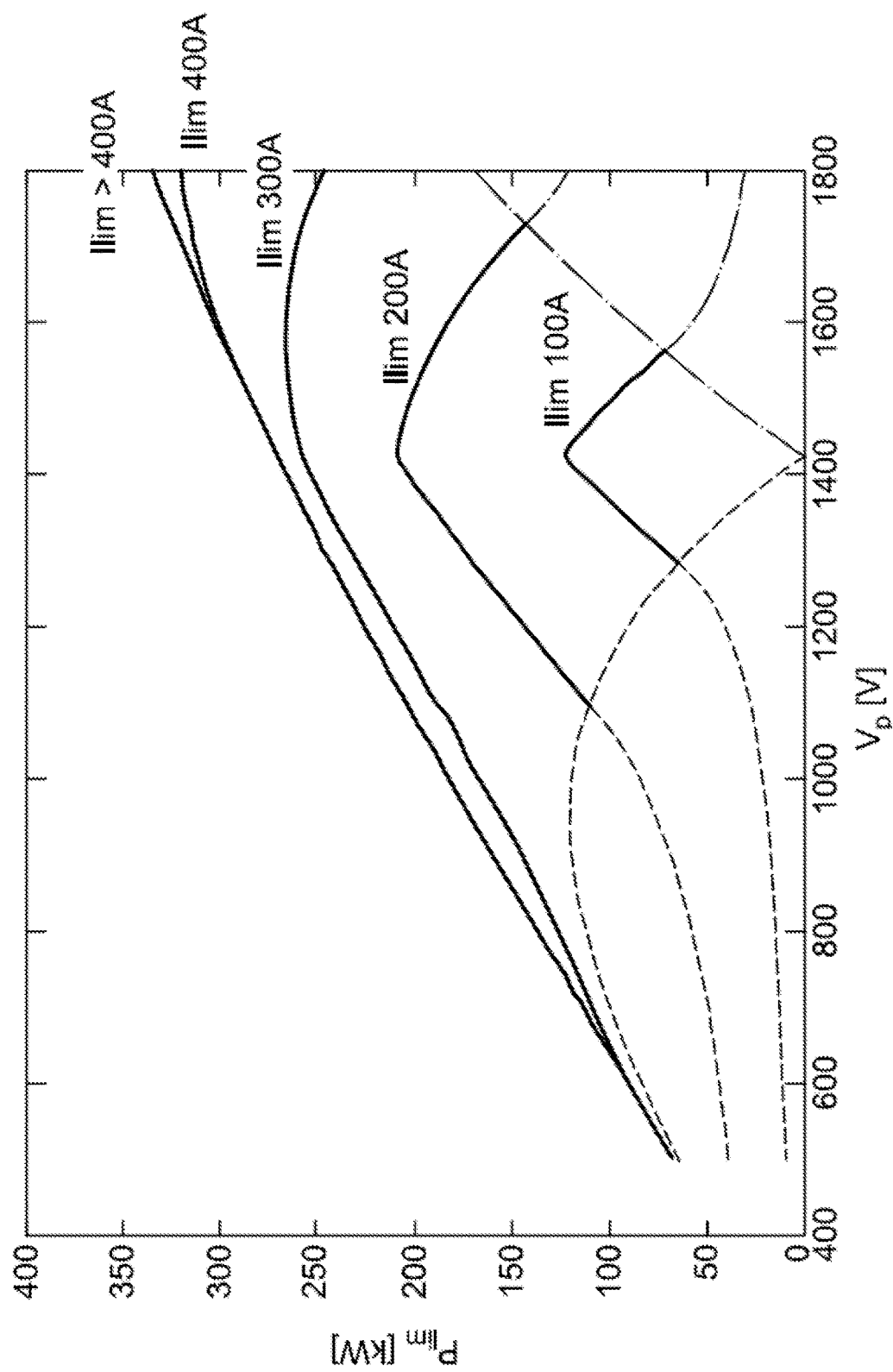
FIG. 39 shows operating envelopes for various values of I_max.

FIG. 39 illustrates operating envelopes, within an exemplary switching mode map, for various values of individual switch current limit I_lim.

Also of note, a switching mode map can be determined 308 based solely on non-variable system parameters (e.g., Ls,n; fsw_e); or, as described above, incorporating at least one variable system parameter (e.g., Vs_fbk). Thus, generating 308 a switching mode map can be accomplished either a priori, or in hard real time; so that it is possible to reduce the hard real time process to identifying 302 Vp_fbk, determining 309 P_ref, selecting 310 a switching mode, and then calculating 320 gate trigger voltage timing.

Thus, embodiments of the invention provide a power converter, which includes primary and secondary bridges and a transformer, as well as a controller that is configured to generate a switching mode map that correlates each of a plurality of switching modes to a respective set of value ranges of system parameters of the power converter, the sets of system parameter value ranges being contiguous and non-overlapping across the switching mode map, each of the plurality of switching modes including a set of gate trigger voltage timings for commuting at least one of the primary and secondary bridges. The controller is further configured to periodically implement a switching cycle that includes obtaining a plurality of measured system parameter values, selecting from the switching mode map one of the plurality of switching modes that correlates to the set of system parameter values containing the plurality of measured system parameter values, and adjusting gate trigger voltage timings of at least one of the primary and secondary bridges, according to the selected switching mode.

In certain embodiments, each of the switching modes defines a respective set of trigger voltage timing equations, and at least one pair of the plurality of switching modes that are mutually contiguous have their respective sets of trigger voltage timing equations defined to produce mutually compatible waveforms of primary and secondary transformer winding voltages (Vp, Vs) at a boundary of the mutually contiguous switching modes. In certain embodiments, at least one of the switching modes is designed such that a transformer current of the transformer is equal to zero amperes at a beginning and at an end of a switching cycle in which a new switching mode is selected. In certain embodiments, the switching modes include at least two of a single phase shift (SPS) mode, a triple phase shift trapezoidal (TR) mode, a triple phase shift boost trapezoidal (BoT) mode, a triple phase shift buck trapezoidal (BuT) mode, or a triple phase shift saturated buck trapezoidal (BuST) mode. In certain embodiments, the controller is configured to generate the switching mode map in hard real time based on at least one of the plurality of measured system parameter values. In certain embodiments, the controller is configured to generate only a selected portion of the switching mode map, and to select the portion of the switching mode map in hard real time based on at least measured values of secondary winding voltage and of primary winding voltage. In certain embodiments, a maximum power flow through the power converter is limited to a value that corresponds to a maximum designed value of current through the transformer. In certain embodiments, on consecutive switching cycles at least one of the modes exchanges switching patterns among switches within at least one of the primary bridge or the secondary bridge. In certain embodiments, the controller is configured to obtain, select, and adjust in hard real time.

In other embodiments, a controller for a power converter is configured to commute primary and secondary bridges of the power converter, according to any of a plurality of switching modes, in order to maintain secondary link voltage and power requirements. The controller is configured to generate a switching mode map of system parameter values that bound the plurality of switching modes, and is configured to select from the switching mode map, based on measured values of system parameters including at least primary link voltage and secondary link voltage, one of the plurality of switching modes that corresponds to a target value of secondary link current. The controller also is configured to adjust gate trigger voltage timings of the primary and secondary bridges, according to said one of the plurality of switching modes that is selected, in order to maintain a target value of secondary link voltage. In certain embodiments, each of the switching modes defines a set of trigger voltage timing equations, and at least one pair of mutually contiguous switching modes have their respective sets of trigger voltage timing equations defined to produce mutually compatible waveforms of primary and secondary transformer winding voltage at a boundary of the mutually contiguous switching modes. In certain embodiments, the switching modes include at least two of a single phase shift (SPS) mode, a triple phase shift trapezoidal (TR) mode, a triple phase shift boost trapezoidal (BoT) mode, a triple phase shift buck trapezoidal (BuT) mode, or a triple phase shift saturated buck trapezoidal (BuST) mode. In certain embodiments, the controller is configured to generate the switching mode map in hard real time based on at least one of the plurality of measured values of system parameters. In certain embodiments, the controller is configured to generate only a selected portion of the switching mode map, and to select the portion of the switching mode map in hard real time based on at least measured values of secondary winding voltage and of primary winding voltage. In certain embodiments, a maximum power flow through the power converter is limited to a value that corresponds to a maximum designed value of current through the transformer. In certain embodiments, at least one of the modes exchanges switching patterns among switches within a bridge on consecutive switching cycles. In certain embodiments, the controller is configured to select and adjust in hard real time.

Some aspects of the invention provide a method for controlling a power converter having primary and secondary bridges. The method includes generating a switching mode map that correlates each of a plurality of switching modes to a respective set of system parameter value ranges, the sets of system parameter value ranges being contiguous and non-overlapping across the switching mode map; obtaining a plurality of measured system parameter values; selecting from the switching mode map one of the plurality of switching modes that correlates to the set of system parameter value ranges containing the plurality of measured system parameter values; and adjusting gate trigger voltage timing according to the selected switching mode, in order to maintain a target value of power transferred between the primary and secondary bridges. In certain aspects, each of the switching modes defines a set of trigger voltage timing equations, and at least one pair of the switching modes that are mutually contiguous have their respective sets of trigger voltage timing equations defined to produce mutually compatible waveforms of primary and secondary transformer winding voltage at a boundary of the mutually contiguous switching modes. In certain aspects, the switching modes include at least two of a single phase shift (SPS) mode, a triple phase shift trapezoidal (TR) mode, a triple phase shift boost trapezoidal (BoT) mode, a triple phase shift buck trapezoidal (BuT) mode, or a triple phase shift saturated buck (BuST) trapezoidal mode. In certain aspects, at least a part of the switching mode map is generated in hard real time based on at least one of the plurality of measured system parameter values. For example, only a selected portion of the switching mode map is generated, and the portion of the switching mode map is selected in hard real time based on at least measured values of secondary winding voltage and of primary winding voltage. In certain aspects, a maximum power flow through the power converter is limited to a value that corresponds to a maximum designed value of current through the transformer. In certain aspects, when the power converter is controlled according to at least one of the switching modes, switching patterns are exchanged among switches within at least one of the primary bridge or the secondary bridge on consecutive switching cycles. In certain aspects, selecting and adjusting are accomplished in hard real time.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described embodiments, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:
1. A power converter comprising:
a primary bridge and a secondary bridge;
a transformer having a primary side and a secondary side, the primary bridge being connected to the primary side of the transformer and the secondary bridge being connected to the secondary side of the transformer; and
a controller configured to generate a switching mode map that correlates each of a plurality of switching modes to a respective set of value ranges of system parameters of the power converter, the sets of system parameter value ranges being contiguous and non-overlapping across the switching mode map, each of the plurality of switching modes including a respective set of gate trigger voltage timings for commuting the primary bridge and the secondary bridge;
the controller further configured to:
determine a target power transfer based on a target DC voltage of the secondary bridge and a target current of the secondary bridge;
select from the switching mode map a first switching mode of the plurality of switching modes that correlates to the set of system parameter value ranges containing a measured DC voltage of the primary bridge and the target power transfer;
adjust gate trigger voltage timings of the primary bridge and the secondary bridge based on the first switching mode, to transfer power between the primary bridge and the secondary bridge across the transformer;
determine a change in at least one of the measured DC voltage of the primary bridge or a measured DC voltage of the secondary bridge;
select a different, second one of any of the other plurality of switching modes from the switching mode map responsive to the change that is determined; and
adjust the gate trigger voltage timings of the primary bridge and the secondary bridge based on the second switching mode;
wherein two or more of the plurality of switching modes are compatible switching modes, wherein the compatible switching modes that are mutually contiguous have their respective sets of trigger voltage timing equations defined to produce mutually compatible waveforms of transformer winding voltages at boundaries of the mutually contiguous switching modes;

and wherein the controller is further configured, responsive to the first switching mode and the second switching mode not being compatible switching modes, to time transitions between the first switching mode and the second switching mode so that gate trigger voltages of the first switching mode and the second switching mode are at least one of removed or applied at zero-current conditions.

2. A power converter comprising:

a primary bridge and a secondary bridge;

a transformer having a primary side and a secondary side, the primary bridge being connected to the primary side of the transformer and the secondary bridge being connected to the secondary side of the transformer; and a controller configured to generate a switching mode map that correlates each of a plurality of switching modes to a respective set of value ranges of system parameters of the power converter, the sets of system parameter value ranges being contiguous and non-overlapping across the switching mode map, each of the plurality of switching modes including a respective set of gate trigger voltage timings for commuting the primary bridge and the secondary bridge, the controller further configured to:
obtain one or more measured system parameter values;
select from the switching mode map a first switching mode of the plurality of switching modes that correlates to the set of system parameter value ranges containing the one or more measured system parameter values;
adjust gate trigger voltage timings of the primary bridge and the secondary bridge based on the first switching mode, to transfer power between the primary bridge and the secondary bridge across the transformer;
determine a change in the one or more measured system parameter values;
select a different, second one of any of the other plurality of switching modes from the switching mode map responsive to the change that is determined; and
adjust the gate trigger voltage timings of the primary bridge and the secondary bridge based on the second switching mode;

wherein two or more of the plurality of switching modes are compatible switching modes, wherein the compatible switching modes that are mutually contiguous have their respective sets of trigger voltage timing equations defined to produce mutually compatible waveforms of transformer winding voltages at boundaries of the mutually contiguous switching modes;

and wherein the controller is further configured, responsive to the first switching mode and the second switching mode not being compatible switching modes, to time transitions between the first switching mode and the second switching mode so that gate trigger voltages of the first switching mode and the second switching mode are at least one of removed or applied at zero-current conditions.

3. A power converter comprising:

a primary bridge and a secondary bridge;

a transformer interconnecting the primary bridge and the secondary bridge; and a controller configured to generate a switching mode map that respectively correlates plural switching modes to plural sets of value ranges of system parameters of the power converter, each of the plurality of switching modes including a respective set of gate trigger voltage timings for controlling the primary bridge and the secondary bridge, the controller further configured to:
obtain one or more measured system parameter values;
select from the switching mode map a first switching mode of the plurality of switching modes based on the measured system parameter values;
control the primary bridge and the secondary bridge based on the first switching mode, to transfer power between the primary bridge and the secondary bridge across the transformer;
determine changes in the one or more measured system parameter values;
responsive to each time the changes fall into a different set of the sets of system parameter value ranges, select, in real hard time, a different switching mode of the plurality of switching modes that correlates to the different set; and
control the primary bridge and the secondary bridge based on the different switching mode;

wherein two or more of the plurality of switching modes are compatible across contiguous boundaries;

and wherein the controller is further configured, responsive to any two of the switching modes that are successively selected not being compatible, to time transitions between the two successively selected switching modes so that gate trigger voltages of the two successively selected switching modes are at least one of removed or applied at zero-current conditions.

4. The power converter of claim 3, wherein the sets of system parameter value ranges are contiguous and non-overlapping across the switching mode map.

* * * * *